(12) United States Patent
Braun et al.

(10) Patent No.: US 9,323,332 B2
(45) Date of Patent: Apr. 26, 2016

(54) FORCE FEEDBACK SYSTEM INCLUDING MULTI-TASKING GRAPHICAL HOST ENVIRONMENT

(71) Applicant: IMMERSION CORPORATION, San Jose, CA (US)

(72) Inventors: Adam C. Braun, Portland, OR (US); Jonathan L. Beamer, Lyndhurst, OH (US); Dean C. Chang, Gaithersburg, MD (US)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 14/589,355

(22) Filed: Jan. 5, 2015

(65) Prior Publication Data

US 2016/0004310 A1    Jan. 7, 2016

Related U.S. Application Data

(63) Continuation of application No. 13/225,899, filed on Sep. 6, 2011, now Pat. No. 8,928,581, which is a continuation of application No. 11/824,593, filed on Jun. 28, 2007, now Pat. No. 8,020,095, which is a (Continued)

(51) Int. Cl.
*G09G 5/00* (2006.01)
*G06F 3/01* (2006.01)
(Continued)

(52) U.S. Cl.
CPC .......... *G06F 3/016* (2013.01); *G06F 3/03543* (2013.01); *G06F 3/0481* (2013.01); *G06F 2203/014* (2013.01)

(58) Field of Classification Search
CPC ..................................................... G06F 3/016

USPC ......................................................... 345/156
See application file for complete search history.

(56) References Cited

U.S. PATENT DOCUMENTS

| 4,334,280 A | 6/1982 | McDonald |
| 5,157,384 A | 10/1992 | Greanias et al. |

(Continued)

FOREIGN PATENT DOCUMENTS

| WO | WO 92/00559 | 1/1992 |
| WO | WO 95/32459 | 11/1995 |

(Continued)

OTHER PUBLICATIONS

File History for U.S. Appl. No. 60/065,122, filed Nov. 12, 1997, in the name of Adam W. Divebliss, et al.

(Continued)

*Primary Examiner* — Jason Olson
(74) *Attorney, Agent, or Firm* — Miles & Stockbridge P.C.

(57) ABSTRACT

A force feedback system provides components for use in a force feedback system including a host computer and a force feedback interface device. An architecture for a host computer allows multi-tasking application programs to interface with the force feedback device without conflicts. One embodiment of a force feedback device provides both relative position reporting and absolute position reporting to allow great flexibility. A different device embodiment provides relative position reporting device allowing maximum compatibility with existing software. Information such as ballistic parameters and screen size sent from the host to the force feedback device allow accurate mouse positions and graphical object positions to be determined in the force feedback environment. Force feedback effects and structures are further described, such as events and enclosures.

11 Claims, 12 Drawing Sheets

Related U.S. Application Data continuation-in-part of application No. 11/504,131, filed on Aug. 14, 2006, now Pat. No. 8,527,873, which is a continuation of application No. 09/974,197, filed on Oct. 9, 2001, now Pat. No. 7,168,042, which is a continuation of application No. 08/970,953, filed on Nov. 14, 1997, now Pat. No. 6,300,936.

(51) Int. Cl.
G06F 3/0354 (2013.01)
G06F 3/0481 (2013.01)

(56) References Cited

U.S. PATENT DOCUMENTS

| | | | |
|---|---|---|---|
| 5,186,629 | A | 2/1993 | Rohen |
| 5,255,211 | A | 10/1993 | Redmond |
| 5,298,890 | A | 3/1994 | Kanamaru et al. |
| 5,442,376 | A | 8/1995 | Tannenbaum et al. |
| 5,459,382 | A | 10/1995 | Jacobus et al. |
| 5,530,455 | A | 6/1996 | Gillick et al. |
| 5,550,562 | A | 8/1996 | Aoki et al. |
| 5,643,087 | A | 7/1997 | Marcus et al. |
| 5,710,574 | A | 1/1998 | Jaaskelainen, Jr. |
| 5,734,373 | A | 3/1998 | Rosenberg et al. |
| 5,742,278 | A | 4/1998 | Chen et al. |
| 5,757,358 | A | 5/1998 | Osga |
| 5,790,108 | A | 8/1998 | Salcudean et al. |
| 5,802,353 | A | 9/1998 | Avila et al. |
| 5,805,165 | A | 9/1998 | Thorne, III et al. |
| 5,825,308 | A | 10/1998 | Rosenberg |
| 5,844,392 | A | 12/1998 | Peurach et al. |
| 5,889,672 | A | 3/1999 | Schuler et al. |
| 5,896,139 | A | 4/1999 | Strauss |
| 5,908,467 | A | 6/1999 | Barrett et al. |
| 5,956,040 | A | 9/1999 | Asano et al. |
| 5,956,484 | A | 9/1999 | Rosenberg et al. |
| 5,973,670 | A | 10/1999 | Barber et al. |
| 5,973,678 | A | 10/1999 | Stewart et al. |
| 5,973,689 | A | 10/1999 | Gallery |
| 5,990,869 | A | 11/1999 | Kubica et al. |
| 5,999,185 | A | 12/1999 | Kato et al. |
| 6,004,134 | A | 12/1999 | Marcus et al. |
| 6,005,551 | A | 12/1999 | Osborne et al. |
| 6,008,800 | A | 12/1999 | Pryor |
| 6,020,876 | A | 2/2000 | Rosenberg et al. |
| 6,028,593 | A | 2/2000 | Rosenberg et al. |
| 6,036,495 | A | 3/2000 | Marcus et al. |
| 6,071,194 | A | 6/2000 | Sanderson et al. |
| 6,078,308 | A | 6/2000 | Rosenberg et al. |
| 6,100,874 | A | 8/2000 | Schena et al. |
| 6,131,097 | A | 10/2000 | Peurach et al. |
| 6,147,674 | A | 11/2000 | Rosenberg et al. |
| 6,161,126 | A | 12/2000 | Wies et al. |
| 6,166,723 | A | 12/2000 | Schena et al. |
| 6,169,540 | B1 | 1/2001 | Rosenberg et al. |
| 6,211,861 | B1 | 4/2001 | Rosenberg et al. |
| 6,219,032 | B1 | 4/2001 | Rosenberg et al. |
| 6,219,034 | B1 | 4/2001 | Elbing et al. |
| 6,252,579 | B1 | 6/2001 | Rosenberg et al. |
| 6,285,351 | B1 | 9/2001 | Chang et al. |
| 6,292,170 | B1 | 9/2001 | Chang et al. |
| 6,292,174 | B1 | 9/2001 | Mallett et al. |
| 6,300,936 | B1 | 10/2001 | Braun et al. |
| 6,424,356 | B2 | 7/2002 | Chang et al. |
| 6,429,846 | B2 | 8/2002 | Rosenberg et al. |
| 6,433,771 | B1 | 8/2002 | Yocum et al. |
| 6,697,748 | B1 | 2/2004 | Rosenberg et al. |
| 6,750,877 | B2 | 6/2004 | Rosenberg et al. |
| 6,859,819 | B1 | 2/2005 | Rosenberg et al. |
| 7,061,467 | B2 | 6/2006 | Rosenberg |
| 7,168,042 | B2 | 1/2007 | Braun et al. |
| 7,969,288 | B2 | 6/2011 | Braun et al. |
| 8,020,095 | B2 | 9/2011 | Braun et al. |
| 2010/0271295 | A1 | 10/2010 | Braun et al. |

FOREIGN PATENT DOCUMENTS

| | | |
|---|---|---|
| WO | WO 96/07965 | 3/1996 |
| WO | WO 97/12357 | 4/1997 |

OTHER PUBLICATIONS

File History for U.S. Appl. No. 60/024,425, filed Aug. 20, 1996, in the name of Eric G. Kubica, et al.

Buttolo, et al., "Architectures for Shared Haptic Virtual Environments," Computer & Graphics, 1997, pp. 1-10.

Sawyer, et al., "Game Developer's Marketplace," The Coriolis Group, Oct. 1, 1997, 415 pgs.

DirectX 5.0 Interface (Windows Drivers). [online] Microsoft Windows, 2013. Retrieved from the Internet: <URL: http://msdn.microsoft.com/en-us/library/windows/hardware/ff538583(v=vs.85).aspx>.

Game Developer Magazine, Jun. 1997, pp. 1-42.

Choi, et al., "Haptic Display in the Virtual Collaborative Workspace Shared by Multiple Users," IEEE International Workshops on Robot and Human Communication, 1997, pp. 478-483.

Rosenberg, L. "I-FORCE From Immersion Corp. Adds "FEEL" To Home Computer Games; Allows Joysticks to Come Alive With Jolts, Blasts, and Other Realistic "Feel" Sensations; The Emerging I-FORCE Standard is Endorsed by Four Major Peripheral Manufacturers and Hundreds of Software Developers," Business Wire, Aug. 5, 1996, 3 pages.

"Force Feedback Products," Immersion Corporation, Nov. 6, 1996, 1 pages.

Microsoft Windows 3.1 Guide to Programming, Microsoft Press: A Division of Microsoft Corporation, Jun. 1, 1992, 8 pages.

The Force API (Release 1.05), Immersion Corporation, Dec. 10, 1996, 22 pages.

Petzold, C., "Programming Windows 95: The Definitive Developer's Guide to the Windows 96 API," Microsoft Press: A Division of Microsoft Corporation, Apr. 1996, 17 pages.

Morrison, et al., "Windows 95 Game Developers Guide Using the Game Sdk," SAMS Publishing, Dec. 1995, 117 pages.

Simon, et al., "Windows 95 Win32 Programming API Bible," Waite Group Press, Feb. 1996, 9 pages.

Ouhyoung, et al., "A Low-Cost Force Feedback Joystick and Its Use in PC Video Games," IEEE Transactions on Consumer Electronics, vol. 41, No. 3, Aug. 1995.

Munch, et al., "Intelligent Control for Haptic Displays," Eurographics '96, vol. 15, No. 3, Blackwell Publishers, 1996, pp. C218-C226.

Su, et al., "The Virtual Panel Architecture: a 3D Gesture Framework," Univ. of Maryland, IEEE 4-7803-1363-1, 1993, pp. 387-393.

Kelley, et al., "On the Development of a Force-Feedback Mouse and its Integration into a Graphical User Interface," 1994 Int'l Mechanical Engineering Congress and Exhibition, 1994, pp. 1-8.

Hac, Anna et al., "Synchronization in Multimedia Data Retrieval," International Journal of Network Management, vol, 7, 1997, pp. 33-62.

Hirose, M. et al., "Development of Haptic Interface Platform (HIP)", Journal of the Virtual Reality Society of Japan, vol. 3, No. 3, pp. 111-119, Sep. 30, 1998 (english abstract).

MacLean, Karon E. et al., "An Architecture for Haptic Control of Media," in: The Proceedings of the ASMA Dynamic Syatems and Control Division: 1999 International Mechanical Engineering Congress and Exposition, Eighth Annual Symposium on Haptic Interfaces for Virtual Environment and Teleoperator Systems, Nov. 14-19, 1999, pp. 1-10.

Pelillo, Marcello et al., "Matching Hierarchical Structures Using Association Graphs," IEEE Transactions on Pattern Analysis and Machine Intelligence, vol. 21, No. 11, pp. 1105-1119, Nov. 1999.

Snibbe, Scott S., "Haptic Techniques for Media Control," In Proceeding of the 14th Annual ACM Symposium on User Interface Software and Technology, 2001, pp. 1-10.

Stanley, Michael C. et al., "Computer Simulation of Interacting Dynamic Mechanical Systems Using Distributed Memory Parallel Processors," DSC—vol. 42, Advances in Robotics, ASME 1992, pp. 55-61.

(56) References Cited

OTHER PUBLICATIONS

United States Patent and Trademark Office, Office Action, U.S. Appl. No. 11/504,131, mailed Apr. 19, 2010.
United States Patent and Trademark Office, Office Action, U.S. Appl. No. 11/504,131, mailed Nov. 2, 2009.
United States Patent and Trademark Office, Office Action, U.S. Appl. No. 11/982,593, mailed Nov. 26, 2010.
Atkin, D., "Get a Hold of This Action," Computer Gaming World, Nov. 1996, p. 257-260.
"Force FX—The new force feedback joystick from CH Products", CH Products, Inc. advertisement, Computer Gaming World, Nov. 1996, p. 261.
Unknown, "Control Advancements Announces the Beta Release of Virtual Reality Mouse", Canada NewsWire, Sep. 9, 1996, 2 pgs.
Dilascia, P., "Editor's Note", Microsoft Systems Journal, Jul. 1995, 1 pg.

FORCE FEEDBACK SYSTEM INCLUDING MULTI-TASKING GRAPHICAL HOST ENVIRONMENT

CROSS-REFERENCES TO RELATED APPLICATIONS

This application is a continuation of U.S. patent application Ser. No. 13/225,899, filed Sep. 6, 2011 and entitled "Force Feedback System Including Multi-Tasking Graphical Host Environment," which is a continuation of U.S. patent application Ser. No. 11/824,593, filed Jun. 28, 2007, now U.S. Pat. No. 8,020,095, issued Sep. 13, 2011, and entitled "Force Feedback System Including Multi-Tasking Graphical Host Environment," which is a continuation-in-part of U.S. patent application Ser. No. 11/504,131, filed Aug. 14, 2006, now U.S. Pat. No. 8,527,873, issued Sep. 3, 2013, and entitled "Force Feedback System Including Multi-Tasking Graphical Host Environment and Interface Device," which is a continuation of U.S. application Ser. No. 09/974,197, filed Oct. 9, 2001, now U.S. Pat. No. 7,168,042, issued Jan. 23, 2007, and entitled "Force Effects for Object Types in a Graphical User Interface," which is a continuation of U.S. application Ser. No. 08/970,953, filed Nov. 14, 1997, now U.S. Pat. No. 6,300,936, issued Oct. 9, 2001, and entitled "Force Feedback System Including Multi-Tasking Graphical Host Environment and Interface Device," in the names of the same inventors and commonly owned herewith, the entirety of all of which are hereby incorporated by reference.

STATEMENT OF GOVERNMENT RIGHTS

One or more claimed embodiments described herein made with Government support under Contract Number F41624-96-C-6029, awarded by the Department of Defense. The Government has certain rights herein.

BACKGROUND

One or more embodiments described herein relates generally to interface devices for allowing humans to interface with computer systems, and more particularly to computer interface devices that allow the user to provide input to computer systems and provide force feedback to the user.

Computer systems are used extensively to implement many applications, such as word processing, data management, simulations, games, and other tasks. A computer system typically displays a visual environment to a user on a display screen or other visual output device. Users can interact with the displayed environment to perform functions on the computer, play a game, experience a simulated environment, use a computer aided design (CAD) system, etc. One visual environment that is particularly common is a graphical user interface (GUI). GUIs present visual images which describe various graphical metaphors of a program or operating system implemented on the computer. Common operating systems using GUIs include the Windows™ operating system from Microsoft Corporation and the MacOS operating system from Apple Computer, Inc. The user typically moves a displayed, user-controlled graphical object, such as a graphical object or pointer, across a computer screen and onto other displayed graphical objects or predefined screen regions, and then inputs a command to execute a given selection or operation. The objects or regions ("targets") can include, for example, icons, windows, pull-down menus, buttons, and scroll bars. Most GUIs are currently 2-dimensional as displayed on a computer screen; however, three dimensional (3-D) GUIs that present simulated 3-D environments on a 2-D screen can also be provided. Other programs or environments that may provide user-controlled graphical objects such as a graphical object or a "view" controlled by the user include graphical "web pages" or other environments offered on the World Wide Web of the Internet, CAD programs, video games, virtual reality simulations, etc.

The user interaction with, and manipulation of, the computer environment is achieved using any of a variety of types of human-computer interface devices that are connected to the computer system controlling the displayed environment. Force feedback interface devices allow a user to experience forces on the manipulated user object based on interactions and events within the displayed graphical environment. Typically, computer-controlled actuators are used to output forces on the user object to simulate various sensations, such as an obstruction force when moving the graphical object into a wall, a damping force to resist motion of the graphical object, and a spring force to bias the graphical object to move back toward a starting position of the spring.

When implementing force feedback sensations in a GUI of an operating system, several problems can arise. One problem is the use of force feedback when multiple application programs are simultaneously running in a multi-tasking environment on the host computer. Most operating systems allow such multi-tasking, for example, to allow a user to interact with one application while one or more applications are also running, receiving data, outputting data, or performing other tasks. For example, in the Windows™ operating system, one application is the "active" application that typically displays an active window in the GUI. The user can manipulate the functions of the active application using the graphical object. Other inactive applications are also running and may have inactive windows displayed in the GUI. The user can switch to a different application by clicking the graphical object in an inactive window, for example, which causes the new application to be the active application and the formerly active application to become inactive.

Each application run by an operating system may have its own set of force sensations that it needs to command to the force feedback device. Thus, one application may need to command spring, force, vibration, and texture force sensations, while a different application may need to command spring, damper, and jolt force sensations. The force feedback device typically cannot store all possible force sensations for each application running in the operating system, so there is a problem of which force sensations the force feedback device should store and implement at any one time. In addition, if two of the multi-tasking applications command conflicting force sensations, the force feedback device needs to choose one of the force sensations to output. Currently is no system or method of doing so.

A different problem occurs when using a force feedback device with a GUI. Traditional mouse controllers used with GUIs are relative position reporting devices, i.e., they report only changes in position of the mouse to the host computer, which the host computer uses to calculate a new position for the graphical object on the screen. Many force feedback devices, in contrast, are typically absolute position reporting devices which report an absolute position of the graphical object, such as screen coordinates, to the host computer. This is because the force feedback device needs to know the graphical object position to accurately determine when forces are to be applied and to accurately calculate the forces. However, it would be desirable in some instances to have a relative position reporting force feedback device, since the host computer is standardized to receive and interpret relative positions at the most basic level. Furthermore, such a relative device would permit the host computer to perform needed adjustments to graphical object position, such as ballistics calculations which modify graphical object position based on mouse velocity to provide enhanced control. If the host computer performs such adjustments, the force feedback device processors are relieved of computational burden.

Another problem occurs when force feedback is implemented with a GUI or other graphical environment and the graphical environment changes resolution or aspect ratio. For example, if a resolution of 640×480 is being displayed by the host computer on a screen, the force feedback device assumes that graphical objects in the GUI have a size proportional to screen dimensions and outputs forces accordingly. However, when the resolution is changed, the objects displayed on the screen change size in proportion to the screen dimensions. The force feedback device continues to check for conditions and, generate forces as if the old resolution were active, resulting in forces that do not correlate with displayed interactions on the screen. The aspect ratio of a display screen can also change, e.g., when two screens are used to provide double the amount of displayed area in the GUI, the aspect ratio doubles in one dimension. Using prior art force feedback devices, forces can become distorted from such an aspect ratio change. For example, a circle object displayed on the screen may have forces at its borders that feel like an ellipse to the user of the interface device, since the aspect ratios of the screen and the mouse workspace are different.

SUMMARY

A force feedback system provides components for use in a force feedback system including a host computer and a force feedback interface device. An architecture for a host computer allows multi-tasking application programs to interface with the force feedback device without conflicts. One embodiment of a force feedback device provides both relative position reporting and absolute position reporting to allow great flexibility. A different device embodiment provides relative position reporting device allowing maximum compatibility with existing software. Information such as ballistic parameters and screen size sent from the host to the force feedback device allow accurate mouse positions and graphical object positions to be determined in the force feedback environment. Force feedback effects and structures are further described, such as events and enclosures. These and other advantages will become apparent to those skilled in the art upon a reading of the following specification and a study of the several figures of the drawings.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

DETAILED DESCRIPTION

Example embodiments are described herein in the context of a system of computers, servers, and software. Those of ordinary skill in the art will realize that the following description is illustrative only and is not intended to be in any way limiting. Other embodiments will readily suggest themselves to such skilled persons having the benefit of this disclosure. Reference will now be made in detail to implementations of the example embodiments as illustrated in the accompanying drawings. The same reference indicators will be used throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with this disclosure, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. It is understood that the phrase "an embodiment" encompasses more than one embodiment and is thus not limited to only one embodiment. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card, paper tape and the like) and other types of program memory.

Figure 1A:
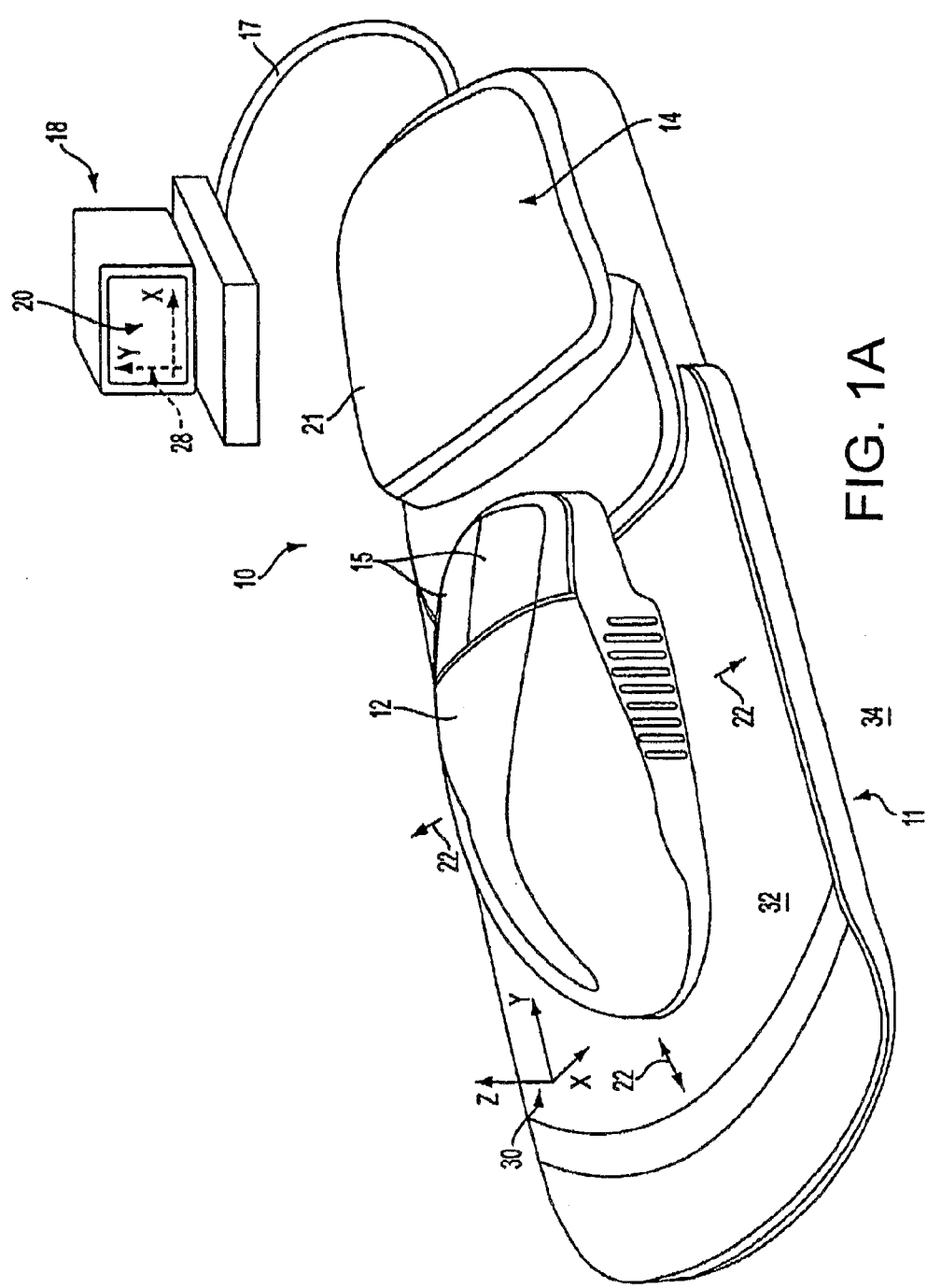
FIG. 1a is a perspective view of a mouse-based user device in accordance with an embodiment.

FIG. 1a is a perspective view of a force feedback mouse interface system 10 in accordance with an embodiment. The system 10 is capable of providing input from the user to a host computer based on the user's manipulation of the mouse and capable of providing force feedback to the user of the mouse system based on events occurring in an environment implemented by the host computer. Mouse system 10 includes an interface device 11 that includes a user manipulatable object or manipulandum 12 and an interface 14, and a host computer 18.

User object (or "manipulandum") 12 is a physical object that is preferably grasped, touched, gripped and/or manipulated by a user. For example, images are displayed and/or modified on a display screen 20 of the computer system 18 in response to such manipulations. In an embodiment, the user object 12 is a mouse 12 that is shaped so that a user's fingers or hand may comfortably grasp the object and move it in the provided degrees of freedom in physical space. For example, a user can move mouse 12 to correspondingly move a computer generated graphical object in a graphical environment provided by computer 18. It should be noted that the term graphical object encompasses a variety of objects which can be controlled within the graphical environment. The graphical object includes, but is not limited to, a cursor, an avatar, a character or vehicle in a video game or virtual environment, an icon, a menu item, a virtual tool (i.e., medical training simulation) and/or a manipulatable object (e.g., volume slider, virtual map). The available degrees of freedom in which mouse 12 can be moved are determined from the interface 14, described below. The mouse 12 may include one or more buttons 15 to allow the user to provide additional commands to the computer system. In an embodiment, the mouse 12 does not include any buttons.

It will be appreciated that a number of other types of user manipulable objects fall within the definition of the user object. In exemplary embodiments, such objects may include a sphere; a trackball; a puck; a joystick; cubical- or other-shaped hand grips; a fingertip receptacle for receiving a finger or a stylus; a flat, planar surface like a plastic card having a rubberized, contoured, and/or bumpy surface; a handheld video game controller; a handheld remote control used for controlling web pages or other devices; a touch panel; a touch pad; and/or a touch screen.

In an embodiment, a small fingertip joystick can be provided, where a small stick is moved in a small planar region with a user's fingertips. Spring forces can be provided by the actuators of the device 11 to bias the stick (or any type of joystick) toward the center of the planar region to simulate a spring return on the joystick. Since fingertips are used, output forces need not be as high a magnitude as in other embodiments. Also, mouse 12 can be provided with such a centering spring bias, e.g., when used like a joystick in gaming applications.

Interface 14 interfaces mechanical and electrical input and output between the mouse 12 and host computer 18 implementing the application program, such as a GUI, simulation or game environment. Interface 14 provides multiple degrees of freedom to mouse 12, and in an embodiment, two linear, planar degrees of freedom are provided to the mouse, as shown by arrows 22. In other embodiments, greater or fewer degrees of freedom can be provided, as well as rotary degrees of freedom. For many applications, mouse 12 need only be moved in a very small workspace area.

In an embodiment, the user manipulates mouse 12 in a planar workspace, much like a traditional mouse, and the position of mouse 12 is translated into a form suitable for interpretation by position sensors of the interface 14. The sensors track the movement of the mouse 12 in planar space and provide suitable electronic signals to an electronic portion of interface 14. The interface 14 provides position information to host computer 18. In addition, host computer 18 and/or interface 14 provide force feedback signals to actuators coupled to interface 14, and the actuators generate forces on members of the mechanical portion of the interface 14 to provide forces on mouse 12 in provided or desired degrees of freedom. The user experiences the forces generated on the mouse 12 as realistic simulations of force sensations such as jolts, springs, textures, enclosures, circles, ellipses, grids, vibrations, "barrier" forces, and the like.

The electronic portion of interface 14 may couple the mechanical portion 24 of the interface to the host computer 18. The electronic portion is preferably included within the housing 21 of the interface 14 or, alternatively, the electronic portion may be included in host computer 18 or as a separate unit with its own housing. More particularly, interface 14 includes a local microprocessor distinct and separate from any microprocessors in the host computer 18 to control force feedback on mouse 12 independently of the host computer, as well as sensor and actuator interfaces that convert electrical signals to appropriate forms usable by the mechanical portion of interface 14 and host computer 18.

For example, a rigid surface is generated on a computer screen 20 and a computer object (e.g., cursor) controlled by the user collides with the surface. In an embodiment, high-level host commands can be used to provide the various forces associated with the rigid surface. The local control mode using a local microprocessor in interface 14 may be helpful in increasing the response time for forces applied to the user object, which is essential in creating realistic and accurate force feedback. For example, a host computer 18 may send a "spatial representation" to the local microprocessor, which is data describing the locations of some or all the graphical objects displayed in a GUI or other graphical environment which are associated with forces and the types/characteristics of these graphical objects. The microprocessor can store such a spatial representation in a local memory, and thus will be able to determine interactions between the user object and graphical objects (such as the rigid surface) independently of the host computer. In addition, the microprocessor can be provided with the necessary instructions or data to check sensor readings, determine cursor and target positions, and determine output forces independently of host computer 18. The host could implement program functions (such as displaying images) when appropriate, and synchronization commands can be communicated between the microprocessor and the host 18 to correlate the microprocessor and host processes. Such commands and related functionality is discussed in greater detail below. In an embodiment, the computer 18 can directly send force feedback signals to the interface 14 to generate forces on mouse 12. A suitable embodiment of the electrical portion of interface 14 is described in detail with reference to FIG. 3, although the description may apply to other embodiments.

The interface 14 can be coupled to the computer 18 by a bus 17, which communicates signals between interface 14 and computer 18. In an embodiment, the computer 18 provides power to the interface 14 (e.g., when bus 17 includes a USB interface). In an embodiment, signals can be sent between interface 14 and computer 18 by wireless transmission/reception. In an embodiment, the interface 14 serves as an input/output (I/O) device for the computer 18. The interface 14 can also receive inputs from other input devices or controls that are associated with mouse system 10 and can relay those inputs to computer 18. For example, commands sent by the user activating a button on mouse 12 can be relayed to computer 18 by interface 14 to implement a command or cause the computer 18 to output a command to the interface 14.

Host computer 18 is a personal computer or workstation in an embodiment. For example, the computer 18 can operate under the Windows™ or MS-DOS operating system. In an embodiment, the host computer system 18 may be one of a variety of home video game systems, such as systems available from Nintendo, Sega, or Sony. In other embodiments, host computer system 18 can be a "set top box" which can be used, for example, to provide interactive television functions to users, or a "network-" or "internet-computer" which allows users to interact with a local or global network using standard connections and protocols such as used for the Internet and World Wide Web. The host computer may be a standalone device such as an automated teller machine (ATM), kiosk, point of sale (POS) device found at a grocery market or department store, Personal Digital Assistant (PDA), and/or mobile phone. Host computer preferably includes a host microprocessor, random access memory (RAM), read only memory (ROM), input/output (I/O) circuitry, and other components of computers well-known to those skilled in the art.

The host computer 18 implements and/or performs one or more application programs ("applications") with which a user is interacting via the user object and/or other peripherals, if appropriate, and which can include force feedback functionality. For example, the host application programs can include a simulation, video game, Web page or browser that implements HTML or VRML instructions, word processor, drawing program, spreadsheet, scientific analysis program, or other application program that utilizes input of the user device and outputs force feedback commands to the user device.

In an embodiment, an operating system such as Windows™, MS-DOS, MacOS, Unix, is also running on the host computer and includes its own force feedback capabilities. In an embodiment, the operating system and application programs utilize a graphical user interface (GUI) to present options to a user, display data and images, and receive input from the user. In the preferred embodiment, multiple applications can run simultaneously in a multitasking environment of the host computer, as is detailed below. Herein, computer 18 may be referred as displaying "graphical objects" or "computer objects." These objects are not physical objects, but are logical software unit collections of data and/or procedures that may be displayed as images by computer 18 on display screen 20, as is well-known to those skilled in the art. The host application program checks for input signals received from the electronics and sensors of interface 14, and outputs force values and/or commands to be converted into forces on the user device.

Display device 20 can be included in the host computer 18 and can be a standard display screen (LCD, CRT, etc.), 3-D goggles, or any other visual output device. In an embodiment, the host application provides images to be displayed on display device 20 and/or other feedback, such as auditory signals. For example, display screen 20 can display images from a GUI. Images describing a moving, first-person point-of-view can be displayed, as in a virtual reality game. Or, images describing a third-person perspective of objects, backgrounds, etc. can be displayed. Alternatively, images from a simulation, such as a medical simulation, can be displayed (e.g., images of tissue and a representation of a manipulated user object 12 moving through the tissue).

There are two primary "control paradigms" of operation for the user device: position control and rate control. Position control refers to a mapping of the input of the user device in which displacement or movement of the user device in a physical space directly dictates displacement of a graphical object, Under a position control mapping, the graphical object does not move unless the user object is in motion. Also, "ballistics" or other non-linear adjustments to cursor position can be used in which, for example, slow motions of the user device have a different scaling factor for graphical object movement than fast motions of the user device. This allows more control of short movements of the graphical object in the graphical environment. Several different ways of implementing ballistics and other control adjustments in a force feedback device are described in U.S. Pat. No. 6,252,579, and these adjustments can be used if desired.

As shown in FIG. 1a, the host computer may have its own "screen frame" 28 (or host frame) which is displayed on the display screen 20. In contrast, the user device has its own "device frame" (or local frame) 30 in which the user device is capable of moving. In a position control paradigm, the position (or change in position) of the graphical object in the host frame 30 corresponds to a position (or change in position) of the user device in the local frame 28.

Rate control is also used as a control paradigm. This refers to a mapping in which the displacement of the user device is abstractly mapped to motion of the graphical object under control. There is not a direct physical mapping between physical object (mouse) motion and computer object motion. Thus, most rate control paradigms are fundamentally different from position control in that the user object can be held steady at a given position but the controlled computer object is in motion at a commanded or given velocity, while the position control paradigm only allows the controlled computer object to be in motion if the user object is in motion.

The interface system 10 is useful for both position control ("isotonic") tasks and rate control ("isometric") tasks. In an example embodiment, the position of a mouse 12 in its local frame 30 workspace can be directly mapped to a position of a graphical object in the host frame 28 on the display screen 20 in a position control paradigm. Alternatively, the displacement of the mouse 12 in a particular direction against an opposing output force can command the rate control tasks in an isometric mode.

In the embodiment shown in FIG. 1a, the mouse 12 is supported and suspended above a grounded pad 32 by the mechanical portion of interface 14. Pad 32 or similar surface is supported by grounded surface 34. Pad 32 (or alternatively grounded surface 34) provides additional support for the mouse and relieves stress on the mechanical portion of interface 14. In addition, a wheel, roller, Teflon pad or other device can be used to support the mouse. The user can move the mouse in a 2D planar workspace to move the graphical object or objects in the GUI or perform other tasks. In other graphical environments, such as a virtual reality video game, a user can be controlling a computer player or vehicle in the virtual environment by manipulating the mouse 12. The computer system tracks the position of the mouse 12 with sensors as the user moves it. The computer system may also provide force feedback commands to the mouse 12, for example, when the user moves the graphical object against a generated surface such as an edge of a window, a virtual wall, etc. It thus appears and feels to the user that the mouse and the graphical object are contacting real surfaces.

In an embodiment, the system 10 may also include an indexing function or "indexing mode" which allows the user to redefine the offset between the positions of the mouse 12 or other user device in the local frame and the graphical object in the host frame displayed by host computer 18. In one implementation, the user may reposition the mouse 12 without providing any input to the host computer, thus allowing the user to redefine the offset between the mouse's position and the graphical object's position. Such indexing is achieved through an input device such as a button, switches, sensors, or other input devices. As long as the indexing device is activated, the mouse 12 or other user device will be in indexing mode. When the button is released (or indexing mode otherwise exited), the position of the cursor is again controlled by the user device. In an embodiment, the mouse 12 includes a hand weight switch which inherently causes indexing when the user removes her hand or finger weight from the mouse 12. A different way to allow indexing is to provide a combined position control and rate control device which allows different forms of control of the graphical object depending on the position of the user device in its workspace. It should be noted that the above description may be applied to all types of user devices described above and is therefore not limited to a mouse device.

Figure 1B:
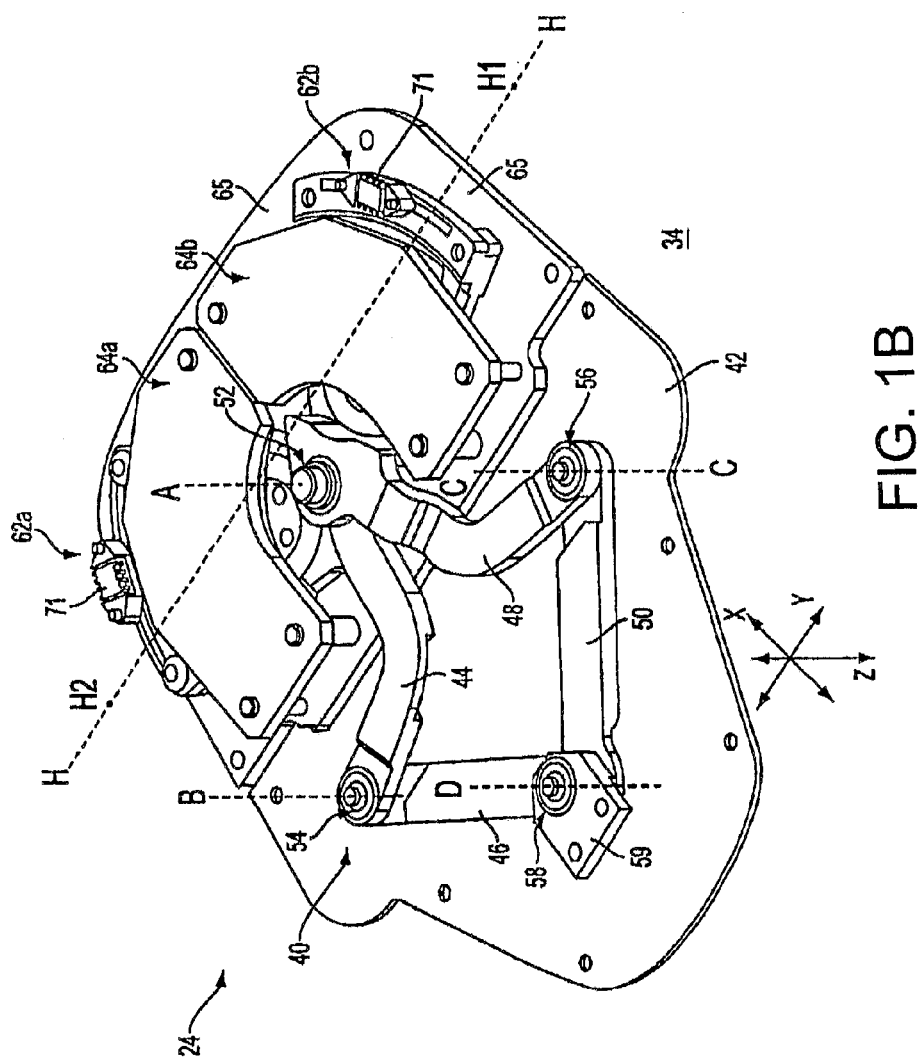
FIG. 1b is a perspective view of a mechanism of the mouse-based user device in accordance with an embodiment.

FIG. 1b is a perspective view of a mouse device 11 with the cover portion of housing 21 and the grounded pad 32 removed in accordance with an embodiment. Mechanical linkage 40 provides support for mouse 12 and couples the mouse to a grounded surface 34, such as a tabletop or other support. In an embodiment, the linkage 40 is a 5-member (or "5-bar") linkage. Fewer or greater numbers of members in the linkage can be provided in alternate embodiments.

In an embodiment, the ground member 42 of the linkage 40 is a base for the support of the linkage and is coupled to or resting on a ground surface 34. The ground member 42 in FIG. 1b is shown as a plate or base that extends under mouse 12. The members of linkage 40 are rotatably coupled to one another through the use of rotatable pivots or bearing assemblies, all referred to as "bearings" herein. Base member 44 is rotatably coupled to ground member 42 by a grounded bearing 52 and can rotate about an axis A. Link member 46 is rotatably coupled to base member 44 by bearing 54 and can rotate about a floating axis B, and base member 48 is rotatably coupled to ground member 42 by bearing 52 and can rotate about axis A. Link member 50 is rotatably coupled to base member 48 by bearing 56 and can rotate about floating axis C, and link member 50 is also rotatably coupled to link member 46 by bearing 58 such that link member 50 and link member 46 may rotate relative to each other about floating axis D.

Linkage 40 is formed as a five-member closed-loop chain. Each member in the chain is rotatably coupled to two other members of the chain to provide mouse 12 with two degrees of freedom, i.e., mouse 12 can be moved within a planar x-y workspace. Mouse 12 is coupled to link members 46 and 50 by rotary bearing 58 and may rotate at least partially about axis D. A pad or other support can be provided under mouse 12 to help support the mouse.

In an embodiment, a transducer system is used to sense the position of mouse 12 in its workspace and to generate forces on the mouse 12. In an embodiment, the transducer system includes sensors 62 and actuators 64. The sensors 62 collectively sense the movement of the mouse 12 in the provided degrees of freedom and send appropriate signals to the electronic portion of interface 14. Sensor 62a senses movement of link member 48 about axis A, and sensor 62b senses movement of base member 44 about axis A. These sensed positions about axis A allow the determination of the position of mouse 12 using known constants such as the lengths of the members of linkage 40 and using well-known coordinate transformations.

In an embodiment, the sensors 62 are grounded optical encoders that sense the intermittent blockage of an emitted beam. A grounded emitter/detector portion 71 includes an emitter that emits a beam which is detected by a grounded detector. A moving encoder disk portion or "arc" 74 is provided at the end of members 44 and 48 which each block the beam for the respective sensor in predetermined spatial increments and allows a processor to determine the position of the arc 74 and thus, the members 44 and 48, by counting the spatial increments. Also, a velocity of members 44 and 48 based on the speed of passing encoder marks can be determined. In one embodiment, dedicated electronics may determine velocity and/or acceleration data to minimize loading problems on the user device.

Transducer system also preferably includes actuators 64 to transmit forces to mouse 12 in space, i.e., in two (or more) degrees of freedom of the user object. The bottom housing plate 65 of actuator 64a is rigidly coupled to ground member 42 (or grounded surface 34) and a moving portion of actuator 64a (preferably a coil) is integrated into the base member 44. The actuator 64a transmits rotational forces to base member 44 about axis A. The housing 65 of the grounded portion of actuator 64b is rigidly coupled to ground member 42 or ground surface 34 through the grounded housing of actuator 64b, and a moving portion of actuator 64b is integrated into base member 48. Actuator 64b transmits rotational forces to link member 48 about axis A. The combination of these rotational forces about axis A allows forces to be transmitted to mouse 12 in all directions in the planar workspace provided by linkage 40 through the rotational interaction of the members of linkage 40. The integration of the coils into the base members 44 and 48 is advantageous and is discussed below. The operation of the electromagnetic actuators 64 is described in greater detail in U.S. Pat. Nos. 6,100,874 and 6,166,723. In other embodiments, other types of actuators can be used and is thus not limited to electromagnetic actuators, piezoelectric actuators, electroactive polymers, standard speakers, E-core type actuators, solenoids, eccentric mass motors, linear repetitive motors, and DC motors.

As stated above, in an embodiment the user device is a touch panel, also known as a touch screen, a touch pad, and a touch screen display. A touch panel includes a touch-sensitive input panel and a display device capable of providing a user with a machine or computer interface in which the panel is sensitive to the user's touch and displays content that responds to the user digit(s) touching the panel. In an embodiment, the touch panel is a planar rectangular pad which can be installed in, on, or near a computer, an automobile, ATM machine, kiosk, mobile phone, Personal Digital Assistant (PDA), media player, etc. In an embodiment, the touch panel fits over a display in which graphical objects (e.g., icons, menu items, cursors, etc.) are selectable and/or manipulatable by the user's touch. In an embodiment, the touch panel incorporates haptic capability in which the touch panel is capable of providing a haptic feedback or force feedback effect to a user's finger when the user touches the touch panel. In an embodiment, the touch panel is capable of outputting one or more unique haptic sensations for one or more graphical objects that the user selects via input in the touch panel. For example, the touch panel with haptic capability allows a user to feel the graphical objects without visually seeing the touch panel. This is advantageous in situations where the user may need to visually concentrate on other things going on (e.g., driving a car while selecting a radio station through the car's stereo).

Figure 2:
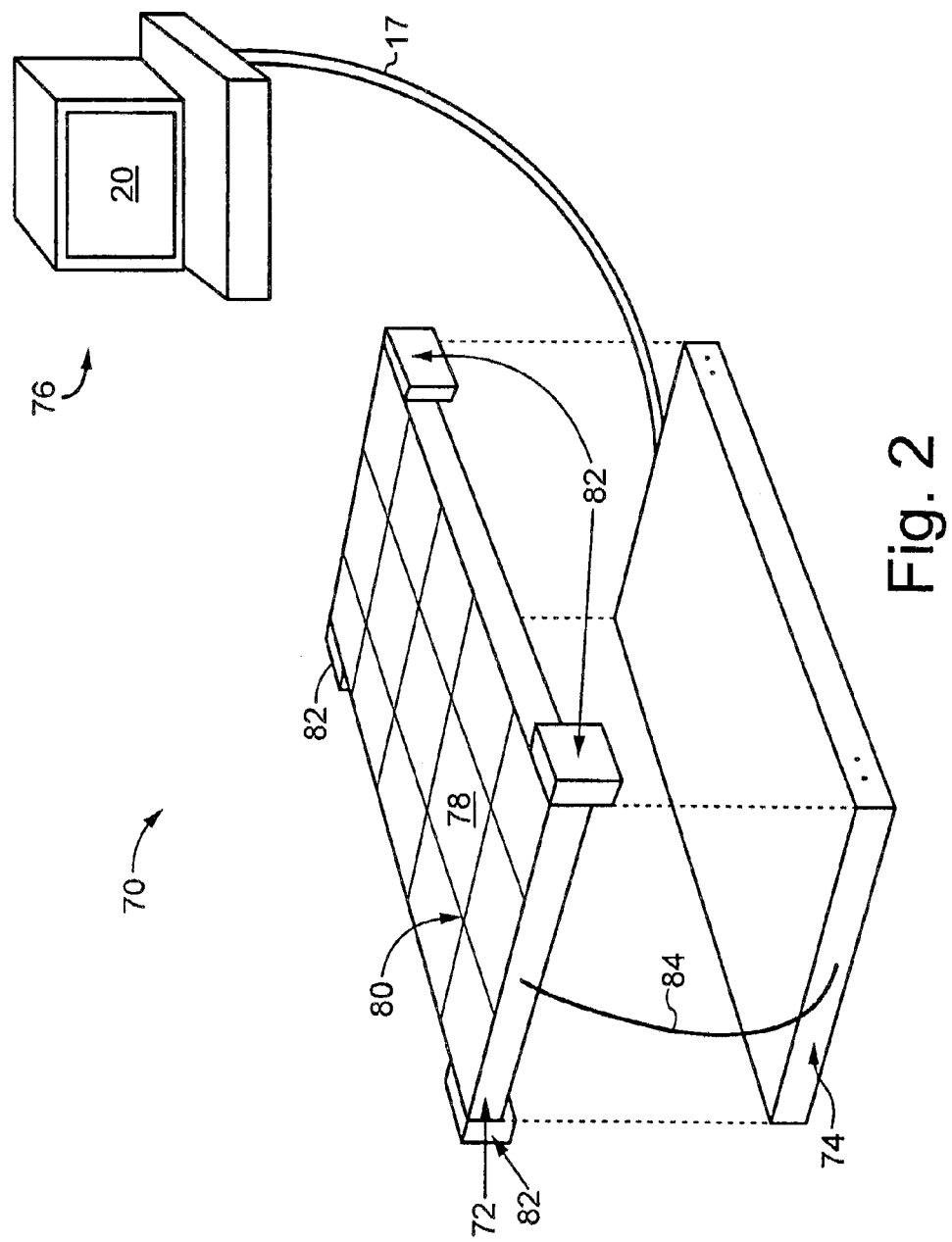
FIG. 2 is a perspective view of a touch panel-based user device in accordance with an embodiment.

FIG. 2 illustrates the user device being a touch panel in accordance with an embodiment. In an embodiment, the user device 70 includes a touch-sensitive panel 72, a display panel 74, and a host computer 76 coupled to the display panel 74. In an embodiment, the host computer 76 is separate from the display panel 74, as shown in FIG. 2, wherein the host computer 76 runs a software application program which provides the graphical objects and graphical environment to the display panel 74 to be displayed to the user. In an embodiment, the host computer 76 and the display panel 74 are integrated as one device upon which the touch-sensitive panel 72 disposed. Such an embodiment is applicable in a mobile phone, game player, media player, or PDA utilizing a touch panel.

In an embodiment, the touch-sensitive panel 72 is made of a transparent material and is capable of transmitting light from the display panel 74 therethrough to the user, so that objects or images displayed by the display panel 74 are able to be easily seen through the touch-sensitive panel 72. The touch panel employs various types of touch sensing technology including, but not limited to, capacitive sensing, resistive sensing, and others known in the art to detect the user's digits at various locations on the panel. In an embodiment, a user contacts the touch panel showing a graphical object thereon to emulate a button press. It is also possible for the user to move his or her finger along the panel 72 to access certain features, perform functions and/or select items which are displayed. In an embodiment, the touch-sensitive panel 72 is further divided into various regions 78 separated by borders 80 which may or may not be visible on the touch-sensitive panel 72.

As will be discussed in more detail below, the touch panel user device operates as such in an embodiment where the speed of the user's fingertip on the touch-sensitive panel correlates to the distance that the graphical object is manipulated in the graphical environment. For example, if the user moves his or her finger quickly across the touch-sensitive panel, the graphical object (e.g., a cursor, avatar, etc.) is moved a greater distance in the graphical environment than if the user moves the fingertip more slowly.

The user device shown in FIG. 2 further includes one or more actuators 82 which apply haptic forces which are transmitted to the touch-sensitive panel 72 when the actuators 82 are activated. In an embodiment, the actuators 82 excite motion in the plane of the touch-sensitive panel 72. In an embodiment, actuators 82 excite motion out of the plane of the touch-sensitive panel 72 (e.g., orthogonal to the plane and/or at an angle to the plane of the touch-sensitive panel 72). In an embodiment, all the actuators are energized simultaneously to output a cumulative haptic effect to the touch-sensitive panel 72. In an embodiment, one or more actuators are sequentially and/or non-simultaneously energized to output different haptic effects to the touch-sensitive panel 72 depending on the location where the user touches the touch-sensitive panel 72. Using one or more actuators coupled to the touch-sensitive panel 72, a variety of haptic sensations can be output to the user who is contacting the panel. For example, jolts, vibrations (varying or constant amplitude), and textures can be output by the actuators. Forces output on the panel 72 can be, at least in part, based on the location of the finger on the panel; on the state of a graphical object in the graphical environment; and/or on an event that is independent of finger position or graphical object state. Such independent forces output on the panel 72 can be "computer-controlled" since a microprocessor (local or remote) from the display device 74 controls the magnitude and/or direction of the force output of the actuator(s) using electronic signals. The types of actuators which may be used with the touch panel user device include piezoelectric actuators, electroactive polymers, voice coil actuators, standard speakers, E-core type actuators, solenoids, eccentric mass motors, linear repetitive motors, DC motors, and moving magnet actuators.

The display 74 can be any type of display such as a cathode ray tube (CRT), liquid crystal display (LCD), plasma display, flat-panel display, or could even be a static illustration. In an embodiment, the display panel 74 includes a local controller or microprocessor, local memory, and data bus for data processing. In an embodiment, a bus 84 is used to facilitate data or signal transfer between the display panel 74 and the touch-sensitive panel 72. In an embodiment, conductive integrated connections may be implemented on the display panel 74 and the touch-sensitive panel 72, such that data and signal transfer can occur between the two without the need for wires and upon the touch-sensitive panel 72 being mounted to the display panel 74. In an embodiment, the touch sensitive panel 72 and computer may communicate with one another wirelessly using a wireless media transmitting through personal area network ("PAN") and/or wireless local area network ("WLAN").

In an embodiment, the host computer 76 is a digital processing system, workstation, server, mini-computers, or mainframe computers. For example, host computer 76 can operate under the Windows™ or MS-DOS operating system in conformance with a personal computer standard. The host computer 76 includes a host microprocessor, random access memory (RAM), read only memory (ROM), input/output (I/O) circuitry, and other components such as wireless communication circuitry and network communication circuitry. In an embodiment, the host computer 76 implements one or more application programs with which a user interacts via the touch panel 70 or other user device utilizing the force feedback functionality afforded to the user device.

For example, the host application programs can include a simulation, video game, Web page or browser that implements HTML or VRML instructions, word processor, drawing program, spreadsheet, scientific analysis program, Point of Sale (POS) program, or other application program that utilizes input of the touch panel user device 70 and outputs force feedback commands to the touch panel user device 70 to be output to the user as haptic effects. In another example, the touch panel user device 70 can display images of a GUI supplied by the host computer 76. Graphical objects such as a first person point of view can be displayed via the display panel 74, as in a virtual reality game. Additionally or alternative, graphical objects representing a third-person perspective of objects, backgrounds, etc. can be displayed via the user device.

Figure 3:
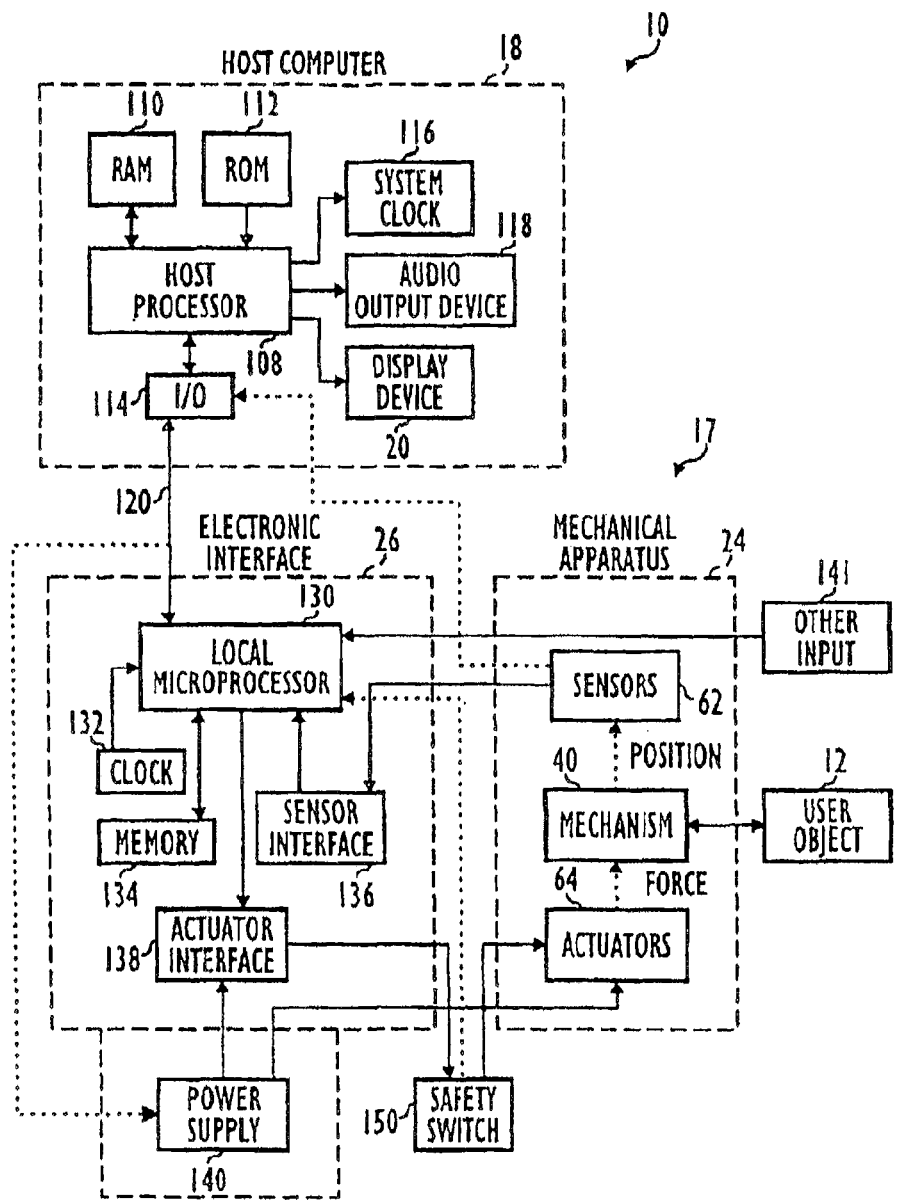
FIG. 3 is a block diagram of the system in accordance with an embodiment.

FIG. 3 is a block diagram illustrating the electronic portion of interface 14 and host computer 18 in accordance with an embodiment. The system 10 includes a host computer 18, electronic interface 26, mechanical portion 24, and the user device. Electronic interface 26 and the user device are collectively considered the "force feedback interface device" 11 that is coupled to the host computer. In an embodiment, "force feedback interface device" includes the mechanical portion 24, depending on whether the user device has mechanical components. For example, the force feedback interface device for a user device which is a mouse would include a mechanical portion 24 whereas a user device which is a touchscreen or touch panel would not necessarily include a mechanical portion 24.

Host computer system 18 commonly includes a host microprocessor 108, random access memory (RAM) 110, read-only memory (ROM) 112, input/output (I/O) electronics 114, a clock 116, a display device 20, and an audio output device 118. Host microprocessor 108 can include a variety of available microprocessors from Intel, AMD, Motorola, or other manufacturers. Microprocessor 108 can be single microprocessor chip, or can include multiple primary and/or co-processors. Microprocessor 108 preferably retrieves and stores instructions and other necessary data from RAM 110 and ROM 112 as is well-known to those skilled in the art. In the described embodiment, host computer system 18 can receive sensor data or a sensor signal via a bus 120 from sensors of system 10. Microprocessor 108 can receive data from bus 120 using I/O electronics 114, and can use I/O electronics to control other peripheral devices. Host computer system 18 can also output commands to interface device via bus 120 to cause force feedback for the interface system 10.

Clock 116 is a standard clock crystal or equivalent component used by host computer 18 to provide timing to electrical signals used by host microprocessor 108 and other components of the computer system 18. Display device 20 has been described above. Audio output device 118, such as speakers, can be coupled to host microprocessor 108 via amplifiers, filters, and other circuitry well-known to those skilled in the art. Host processor 108 outputs signals to speakers 118 to provide sound output to the user when an "audio event" occurs during the implementation of the host application program. Other types of peripherals can also be coupled to host processor 108, such as storage devices (hard disk drive, CD ROM drive, floppy disk drive, integrated or remote server, etc.), printers, and other input and output devices.

In an embodiment, the electronic interface 26 is coupled to host computer system 18 by a bi-directional bus 120. The bi-directional bus sends signals in either direction between host computer system 18 and the interface device. Bus 120 can be a serial interface bus providing data according to a serial communication protocol, a parallel bus using a parallel protocol, or other types of buses. An interface port of host computer system 18, such as an RS232 serial interface port, connects bus 120 to host computer system 18. In another embodiment, an additional bus can be included to communicate between host computer system 18 and interface device 11. In an embodiment, a USB standard connector provides a relatively high speed serial interface that can provide force feedback signals with a high degree of realism. USB can also source power to drive actuators 64 and other devices. In addition, the USB standard includes timing data that is encoded along with differential data. Alternatively, Firewire (also called 1392) can be used as bus 120; or, the bus can be between an interface card in the host computer 18, where the interface card holds components of device 11 such as microprocessor 130.

In an embodiment, the electronic interface 26 includes a local microprocessor 130, local clock 132, local memory 134, sensor interface 136, and actuator interface 138. Interface 26 may also include additional electronic components for communicating via standard protocols on bus 120. In various embodiments, electronic interface 26 can be included in mechanical portion 24, in host computer 18, or in its own separate housing. Different components of interface 26 can be included in portion 24 or host computer 18 if desired.

Local microprocessor 130 is preferably coupled to bus 120 and may be closely linked to allow quick communication with other components of the interface device. Processor 130 is considered "local" to interface device 11, where "local" herein refers to processor 130 being a separate microprocessor from any processors 108 in host computer 18. "Local" also refers to a processor 130 being dedicated to force feedback and sensor I/O of the interface system 10, and being closely coupled to sensors and actuators of the mechanical portion 24, such as within the housing of, or in a housing coupled closely to, portion 24. Microprocessor 130 can be provided with software instructions to wait for commands or requests from computer host 18, parse/decode the command or request, and handle/control input and output signals according to the command or request. In addition, processor 130 preferably operates independently of host computer 18 by reading sensor signals and calculating appropriate forces from those sensor signals, time signals, and force processes selected in accordance with a host command, and output appropriate control signals to the actuators. A suitable microprocessor for use as local microprocessor 130 includes the 8X930AX by Intel; or alternatively the MC68HC711E9 by Motorola or the PIC16C74 by Microchip, for example. Microprocessor 130 can include one microprocessor chip, or multiple processors and/or co-processor chips. In an embodiment, microprocessor 130 can include digital signal processor (DSP) functionality.

For example, in one host-controlled embodiment that utilizes microprocessor 130, host computer 18 can provide low-level force commands over bus 120, which microprocessor 130 directly transmits to the actuator(s). In a different local control embodiment, host computer system 18 provides high level supervisory commands to microprocessor 130 over bus 120, and microprocessor 130 manages low level force control loops to sensors and actuators in accordance with the high level commands and independently of the host computer 18. In the local control embodiment, the microprocessor 130 can process inputted sensor signals to determine appropriate output actuator signals by following the instructions of a "force process" that may be stored in local memory and includes calculation instructions, formulas, force magnitudes, or other data. The force process can command distinct force sensations, such as vibrations, textures, jolts, or even simulated interactions between displayed objects. An "enclosure" host command can also be provided, which causes the microprocessor to define a box-like enclosure in a graphical environment, where the enclosure has sides characterized by wall and texture forces. The host can send the local processor a spatial layout of objects in the graphical environment so that the microprocessor has a mapping of locations of graphical objects like enclosures and can determine interactions with the cursor locally.

Sensor signals used by microprocessor 130 are also reported to host computer system 18, which updates a host application program and outputs force control signals as appropriate. For example, if the user operates the user device, the computer system 18 receives position and/or other signals indicating this input and can move a displayed graphical object in response. In an alternate embodiment, no local microprocessor 130 is included in interface system 10, and host computer 18 directly controls and processes all signals to and from the interface 26 and user device.

In an embodiment, a local clock 132 is coupled to the microprocessor 130 to provide timing data, similar to system clock 116 of host computer 18; the timing data might be required, for example, to compute forces output by actuators 64 (e.g., forces dependent on calculated velocities or other time dependent factors). In an embodiment using the USB communication interface, timing data for microprocessor 130 can be retrieved from the USB interface. Local memory 134, such as RAM and/or ROM, is preferably coupled to microprocessor 130 in interface 26 to store instructions for microprocessor 130 and store temporary and other data. Microprocessor 130 may also store calibration parameters in a local memory 134 such as an EEPROM. Memory 134 may be used to store the state of the force feedback device, including a reference position, current control mode or configuration, etc.

In an embodiment, the sensor interface 136 is included in electronic interface 26 to convert sensor signals to signals that can be interpreted by the microprocessor 130 and/or host computer system 18. For example, sensor interface 136 can receive signals from a digital sensor such as an encoder and convert the signals into a digital binary number representing input information. An analog to digital converter (ADC) in sensor interface 136 can convert a received analog signal to a digital signal for microprocessor 130 and/or host computer 18. Such circuits, or equivalent circuits, are well-known to those skilled in the art. Alternately, microprocessor 130 or host 18 can perform these interface functions.

In an embodiment, the actuator interface 138 is connected between the actuators 64 and microprocessor 130. Interface 138 converts signals from microprocessor 130 into signals appropriate to drive the actuators. Interface 138 can include power amplifiers, switches, digital to analog controllers (DACs), and other components. Such interfaces are well-known to those skilled in the art. In alternate embodiments, interface 138 circuitry can be provided within microprocessor 130 or in the actuators.

In the described embodiment, power is supplied to the actuators 64 and any other components (as required) by the USB. Since the electromagnetic actuators of the described embodiment have a limited physical range and need only output, for example, about 3 ounces of force to create realistic force sensations on the user, very little power is needed. For example, one way to draw additional power from the USB is to configure device 11 to appear as more than one peripheral to host computer 18; for example, each provided degree of freedom of mouse 12 can be configured as a different peripheral and receive its own allocation of power. Alternatively, power from the USB can be stored and regulated by device 11 and thus used when needed to drive actuators 64. For example, power can be stored over time and then immediately dissipated to provide a jolt force to the user object 12. A battery or a capacitor circuit, for example, can store energy and discharge or dissipate the energy when power is required by the system and/or when enough power has been stored. In an embodiment, a power supply 140 is coupled to the actuator interface 138 and/or actuators 64 to provide electrical power. The power storage embodiment described above, using a battery or capacitor circuit, can also be used in non-USB embodiments to allow a smaller power supply 140 to be used.

In an embodiment in which the user device utilizes a mechanical portion 23, the mechanical portion 24 is coupled to electronic portion and includes sensors 62, actuators 64, and linkage 40. Sensors 62 sense the position, motion, and/or other characteristics of user device 12 along one or more degrees of freedom and provide signals to microprocessor 130 including information representative of those characteristics. Typically, a sensor 62 is provided for each degree of freedom along which the user device can be moved, or, a single compound sensor can be used for multiple degrees of freedom. Example of sensors suitable for embodiments described herein are rotary optical encoders, as described above, linear optical encoders, analog sensors such as potentiometers, or non-contact sensors, such as Hall effect magnetic sensors or an optical sensor such as a lateral effect photo diode having an emitter/detector pair. In an embodiment, velocity sensors (e.g., tachometers) and/or acceleration sensors (e.g., accelerometers) are used. Furthermore, either relative or absolute sensors can be employed.

Actuators 64 transmit forces to the user device in one or more directions along one or more degrees of freedom in response to signals output by microprocessor 130 and/or host computer 18, whereby they are "computer controlled." In an embodiment, an actuator 64 is provided for each degree of freedom along which forces are desired to be transmitted. Actuators 64 can be the electromagnetic actuators described above, or can be other active actuators, such as linear current control motors, stepper motors, pneumatic/hydraulic active actuators, a torquer (motor with limited angular range); or passive actuators such as magnetic particle brakes, friction brakes, or pneumatic/hydraulic passive actuators, passive damper elements, an electrorheological fluid actuator, a magnetorheological fluid actuator. In addition, in voice coil embodiments as well as multiple wire coils can be provided, wherein some of the coils can be used to provide back EMF and damping forces. In an embodiment, all or some of sensors 62 and actuators 64 can be included together as a sensor/actuator pair transducer. It should be noted that the actuator may be applied to any type of user device described above even though the mouse 12 is shown in FIG. 1a. In the embodiment in which the user device utilizes the mechanical linkage shown or a variation thereof, the user device may incorporate a puck, knob, joystick, stylus, or other device as described above. These other input devices 141 can optionally be included in system 10 and send input signals to microprocessor 130 and/or host computer 18. Such input devices can include buttons, such as buttons 15 on mouse 12, used to supplement the input from the user to a GUI, game, simulation, etc. Also, dials, switches, voice recognition hardware (with software implemented by host 18), or other input mechanisms can be used.

In an embodiment, safety or "deadman" switch 150 is preferably included in interface device to provide a mechanism to allow a user to deactivate actuators 64 for safety reasons. In the preferred embodiment, the user must continually close safety switch 150 during manipulation of mouse 12 to activate the actuators 64. If, at any time, the safety switch is deactivated (opened) the actuators are deactivated while the safety switch is open. For example, one embodiment of safety switch is a capacitive contact sensor that detects when the user is contacting mouse 12. Alternatively, a mechanical switch, electrostatic contact switch, or optical switch located on mouse 12 or on a convenient surface of a housing 21 can be used. A z-axis force sensor, piezoelectric sensors, force sensitive resistors, or strain gauges can also be used. The state of the safety switch can be sent to the microprocessor 130 or host 18. In an embodiment, mouse 12 includes a hand weight safety switch. The safety switch preferably deactivates any generated forces on the mouse when the mouse is not in use and/or when the user desires to deactivate output forces.

In an embodiment, multiple mechanical apparatuses 102 and/or electronic interfaces 100 can be coupled to a single host computer system 18 through bus 120 (or multiple buses 120) so that multiple users can simultaneously interface with the host application program (in a multi-player game or simulation, for example). In addition, multiple players can interact in the host application program with multiple interface systems 10 using networked host computers 18, as is well-known to those skilled in the art. Also, the interface device can be coupled to multiple host computers; for example, a local host computer can display images based on data received from a remote host computer coupled to the local host through a network.

Architecture of Host Computer

The host computer 18 interacts with interface device 11 using a number of different levels of controllers. These controllers are preferably implemented in software, e.g., program instructions or code; however, all or part of the controllers may also be implemented in hardware, wherein the conversion of functionality of the software to hardware is well-known to those skilled in the art.

The architecture described herein is oriented towards providing force feedback functionality to a host computer connected to a force feedback interface device, where multiple applications may be running simultaneously on the host computer. Each application program may have its own set of force sensations to output to the device; since the device cannot implement all force sensations at any one time due to cost and hardware constraints, the forces commanded by each application must be organized by the architecture to take these limitations into account.

Figure 4:
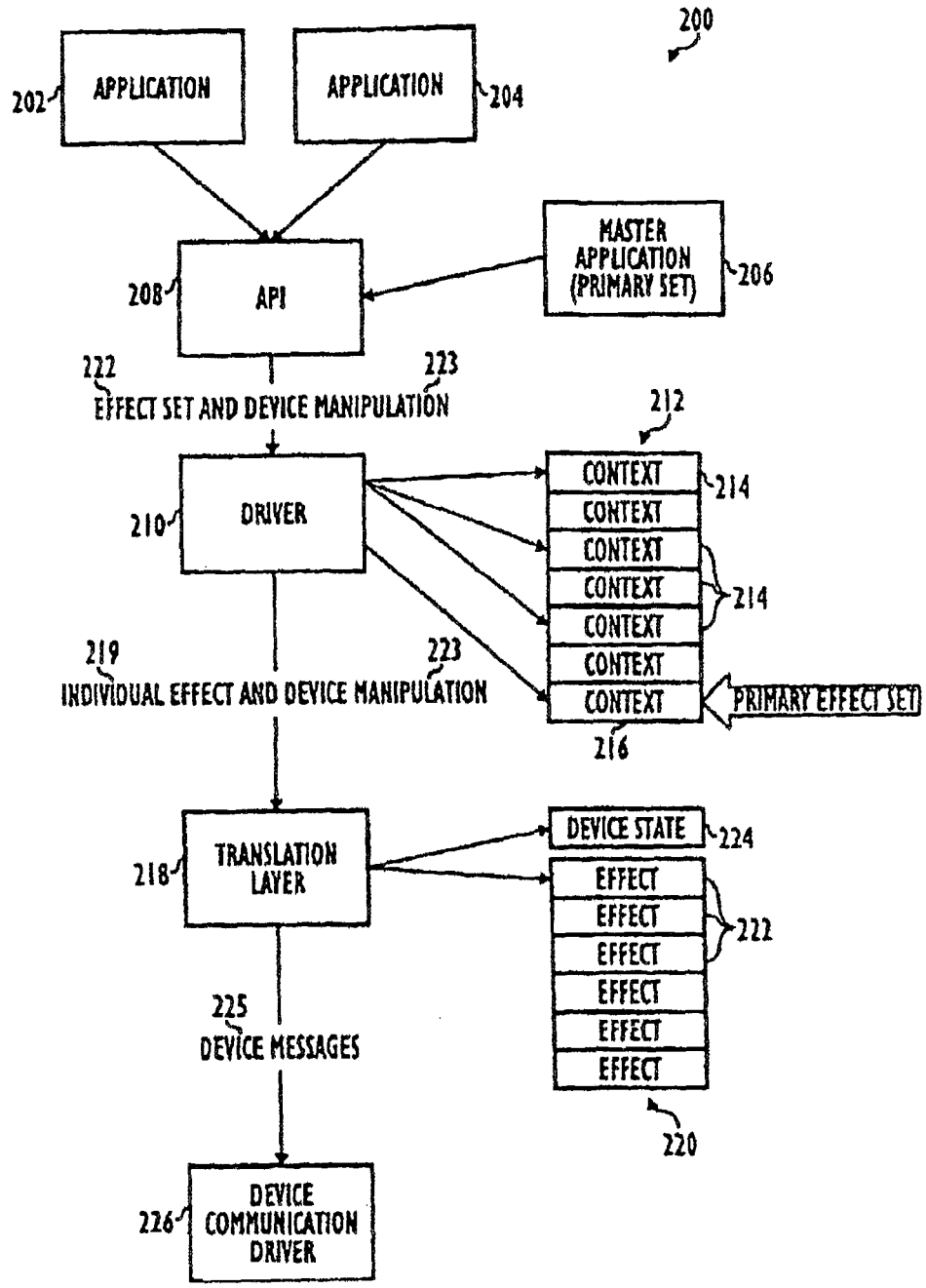
FIG. 4 is a block diagram of an architecture for a host computer providing multiple application programs communicating with the force feedback device in accordance with an embodiment.

FIG. 4 is a block diagram of an architecture for the host computer to communicate with and control a force feedback user device 11 with multiple application programs running on the host computer. Application programs 202 and 204 are concurrently running on the host computer 18. In the most typical implementation, one of the application programs is actively running in an operating system as the "active" application program that displays one or more active windows in the GUI (also known as the application program that is "in focus" or which has "keyboard focus"). The active window is typically the topmost displayed window in which input is provided by the user using the mouse-controlled cursor, a keyboard, or other peripheral. The other applications are "inactive" in that they are not receiving input from the user (although they may have a window displayed in the GUI which can be updated on the screen). The inactive applications may also receive input or send output. For example, the Windows™ operating system from Microsoft Corp. provides a multitasking or pseudo-multitasking environment in which programs run simultaneously; other operating systems such as Unix also offer multitasking. For example, a word processor may be the active application to receive input from the keyboard and display input characters in a displayed active window on display screen 20, while an inactive communication program may be receiving data over a network and saving the data on a storage device, or sending data out to be printed. Or, an inactive drawing program may be displaying a graphical image in a window that is not currently active, while the user inputs text into the active word processor window. When the user moves the cursor over an inactive window and provides a command gesture such as clicking a button on a mouse, the inactive window becomes the active window and the former active window becomes inactive. The active application is also known as the "foreground" application, in the sense that its force sensations are being implemented by the force feedback device, as described below.

A master application 206 also is running on host computer 18 and is also known as the "background" force feedback application. In an embodiment, this application is a general purpose program that always runs inactively in the operating system and whose set of commanded forces are always available to be output and controlled at the user device.

Figure 5:
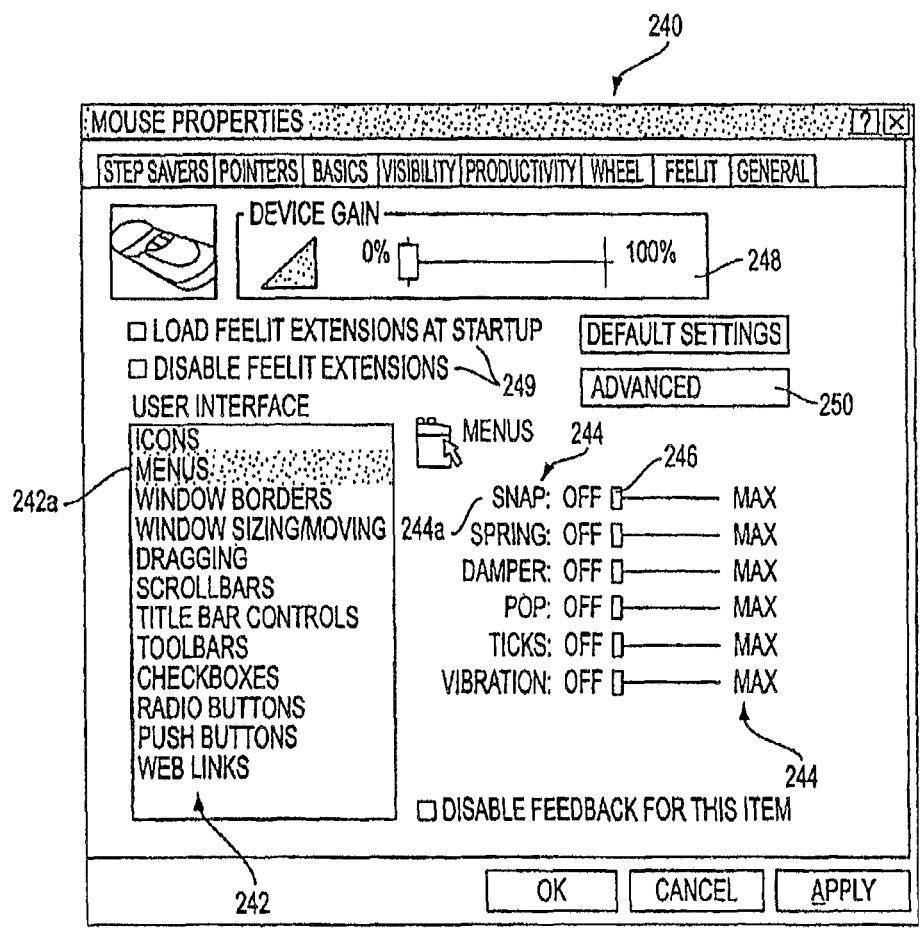
FIG. 5 is a diagrammatic illustration of a background application program control panel allowing a user to characterize background forces in accordance with an embodiment.

In an example embodiment, the master application is a "desktop" control panel as illustrated in FIG. 5. In an embodiment, a "mouse properties" dialog box 240 can be displayed which allows the user to specify force sensations 244 that are assigned to specified object types 242 in the displayed graphical environment, e.g., a graphical user interface (GUI). It should be noted that although the dialog box 240 is shown to apply to mouse properties, dialog box 240 is applicable to other user devices such as a touchpad, touchscreen, joystick, etc. For example, the assigned force sensation 244 can be a vibration force having a specified frequency, magnitude, duration, etc.; a single "pop" or jolt at a specified time and duration; a "tick" that is a small jolt that is output based on manipulation of the user object or graphical object at regular intervals during an activity such as scrolling; a damping force condition that causes a resistance force to the user device depending on the velocity of the user device in its degrees of freedom or the graphical object in the host frame on screen 20; or a spring that resists motion of the user object based on distance to an origin of the spring.

In an embodiment, the force sensations specified by the user for the user device in the dialog box 240 will be output by the user device by default, unless a different foreground application program deactivates the force sensations or replaces a force sensation with its own. For example, the user can specify that menu objects 242a in a GUI have a snap force 244a associated with them by moving the slider 246 to the right, wherein the slider scale specifies the magnitude of the snap force. Thus, when the user selects a menu item in a menu during normal operation, the user will feel a haptic effect. In an embodiment, the haptic effect is a snap force, i.e., a force that draws the user object toward the center of the menu item to allow easier menu selection. In an embodiment, the haptic effect is a vibration that is felt upon the user's finger. This haptic effect is applied to all menus of all running application programs in the GUI since it is a background force effect. For example, if the foreground application program has its own force sensations which define that application's menus to have a jolt instead of a snap, then the jolt will be superimposed on the snap unless the active application program deactivates the background force(s). In general, a particular active application program will typically command forces to objects in its own windows, e.g., that application's own menus, scrollbars, icons, window borders, etc.

In an embodiment, a user can specify multiple background force sensations 244 for each user interface object 242. This allows the multiple force sensations to be superimposed on each other, unless the application program overrides one or more of the superimposed forces. Thus, a user can assign a damper force sensation and a "ticks" force sensation to scrollbars in box 240, and all scrollbars will have these forces associated with them unless overridden by the foreground application program.

Other controls in box 240 may include a device gain 248 to set the percentage of maximum magnitude for all the forces for items 242; and selections 249 to allow force feedback functionality on the host computer. Advanced button 250, when selected, displays an additional window of options with which the user can customize the force sensations 244. For example, a user can specify positive or negative damping (where negative damping feels like moving on ice) or unidirectional or bidirectional dampers. The user can specify the spacing or orientation of snap points on a grid, the envelope parameters for a vibration, or the parameters for a snap force, e.g., the snap force is defined as an enclosure and the user can customize the enclosure to turn off forces on one wall, turn on inner walls, etc. Other application programs can also be used as the background or master application program 206.

Referring back to FIG. 4, application programs 202, 204, and 206 communicate with a force feedback Application Programming Interface ("API") 208 which is resident in the host computer's memory and which allows a given application program to communicate with lower level drivers and other force feedback functions. For example, in the Windows™ operating system, APIs are commonly used to allow a developer of an application program to call functions at a high level for use with the application program, and not worry about the low level details of actually implementing the function.

The API shown in the embodiment in FIG. 4 includes a set of software "objects" that can be called to command a force feedback interface device 11. Objects are a set of instructions and/or data which can be called by a pointer and/or an identifier and parameters to implement a specified function. For example, three types of objects are provided in one preferred API implementation: interface objects, device objects, and effect objects. Each of these objects makes use of one or more force feedback device drivers which are implemented as objects in the API 208.

Interface objects represent the API at the highest level. An application program (which is referred to as a "client" of the API) can create an interface object to access lower level objects and code that implement force feedback device functionality. For example, the interface object allows an application program to enumerate and receive information about individual devices and create lower level objects for each device used by the application program.

Device objects each represent a physical force feedback device (or other compatible device or peripheral) in communication with the host computer 18. For example, the force feedback mouse device described in FIG. 1*a* would be represented as a single device object, whereas a touch panel would be represented as another single device object. The device objects access the set of force feedback routines to receive information about an associated physical device, set the properties of the physical device, register event handlers (if events are implemented on the host), and to create effect objects.

Effect objects each represent a force feedback effect defined by the application program to be output one or more times on a force feedback user device. The effect objects access the set of force feedback routines to download force effects to the force feedback user device, start and stop the output of effects by the force feedback user device, and modify the parameters of the effects. Event objects can also be created to define events, as described in greater detail below.

A force "effect," as referred to herein, is a single defined force or series of forces that may be commanded within the API or by the user device itself. The effect typically has a name to identify it and one or more parameters to modify or customize the force as necessary. For example, several types of force effects have been defined, including vibrations, enclosures, grids, textures, walls, dampers, snap sensations, vibrations, circles, ellipses, etc. For example, a vibration force effect may have parameters of duration, frequency, magnitude, and direction. The force sensations 244 defined in dialog box 244 can be force effects; however, more generally, force sensations can be made up of one or more force effects. Force effects, in turn, are made up of one or more basic force prototypes, such as springs, dampers, and vector forces.

In an embodiment, an application program interacts with the API 208 by first receiving a pointer to a resident force feedback interface; for example, one type of interface includes procedures provided in the Component Object Model (COM) interface of Microsoft Windows™, an object-oriented interface. Using the force feedback interface, the application program enumerates the force feedback devices on the computer system 18. The application program selects a desired one of the force feedback devices and creates a device object associated with that device. Using the force feedback interface, the application then acquires the device, sets the device up with setup and default parameters, and creates effect objects and event objects at times designated by the developer of the application. At appropriate times, the application program will command the start, stop, or pause of the playback of force effects by accessing the appropriate interface instructions associated with the desired effect. The API indicates to the context driver 210 to create a "context" (i.e., "effect set") for an application program, and sends effects and events to be associated with that context. A "context" is a group or set of effects and events that are associated with a particular application program.

In an embodiment, the context driver 210 receives effect set 222 and device manipulation data 223 from the API 208. The context driver 210 is provided at a level below the API to organize contexts for applications 202 and 204 running on the host computer. In an embodiment, the effects and events in a context are not known to the application program itself; rather, the context driver 210 creates the context internally for an application. Thus, an application commands that a particular force sensation be output in response to different interactions or occurrences, e.g., an interaction of a graphical object with another object or region in the graphical environment, or the output of a force based on other criteria (time, received data, random event, etc.). The API sends the commanded effect(s) to the context driver 210, and the context driver stores the effects in the created context for that application program.

Since each application may have a completely different set of force effects to output, each context should be associated with its particular application program. In an embodiment, there are foreground contexts and background or primary contexts. A foreground context is associated with the application program 202 or 204 that is active in the operating system. A background context includes the effects and events for the master application program 206, e.g., the effects and events which implement those force sensations selected by the user in the dialog box 240 of FIG. 5 to be associated with particular GUI objects. In an embodiment, a "global context" may be provided, which includes common effects almost always used by application programs (e.g., a pop force) and which can automatically be downloaded to the force feedback user device. Effects in the global context need not be stored in individual contexts for particular application programs and need not be sent to the force feedback device, thus saving memory on the device.

When an application program is first executed by the host computer and loaded into memory, if the application is able to command a force feedback user device, the application will query for the API 208. Once communication is established, the API will contact the context driver 210 to create an entry location for a context set for the initiated application program.

In an embodiment, the context driver 210 receives individual effects and events as they are created by the application program using the API 208 and stores the effects and events in a context list 212, storing each context in a different storage location in the host's memory or on some other type of storage device. In an embodiment, an active or inactive application program can create a context and have it stored, but only the active application's context will be sent to the force feedback user device. The context driver 210, in an embodiment, can examine an identifier in a created effect or event to determine which application program is associated with it and thus store the effect or event in the proper memory location. The context driver sets pointers to the contexts and to the effects and events in the contexts to access them. The effect can be created initially, before any forces are commanded, or the effect can be created and then immediately commanded to be output to the force feedback device. Each context also preferably includes an entry into a device state structure. This entry governs the "gain" or force level for all effects in the context. For example, all the forces in the context can be cut to 50% of full magnitude by storing a value of 50 in the device state structure. One of the contexts stored in list 214 is a primary context 216, which is the list of effects and events used by the master application 206 or "background" application.

After the context driver has stored the contexts in list 212, an application program may send a command to the API to output or "start" a particular force sensation. In an embodiment, the API checks whether the application program is active or in the background (primary); if not, the API ignores the command. In an embodiment, the commands from an inactive foreground application can be stored and then sent to the device when the application becomes active. If the application is active or background, the API sends the start information to the context driver 210 indicating the application program that commanded the force and the particular force effects to be commanded. The context driver 210 then associates the commanding application program with a context 214 in list 212 and sends the effects from the context to the force feedback device (if not previously sent). For example, if a context for a particular application program includes a spring effect, a damper effect, and a vibration effect, and the application program commands the vibration to be output, then the context driver selects the vibration effects to be output to the device. The data describing this effect is then output by the context driver 210. Similarly, the application program can send a command to stop particular force effects, to pause the effects, to get the status information of an effect, or to destroy an effect.

A context is preferably only allowed to exert forces with the force feedback device when that context is active, i.e., is associated with an active application program or the background application. In an embodiment, only one foreground context can be active at any given time. In another embodiment, more than one foreground context can be active at any given time. Any number of background contexts may be simultaneously active; however, there may be a device limit on the number of background contexts that may be created. For example, the user device may only allow one background context to be created at any one time. Thus, if an inactive (not in focus) foreground application program commands a force to be output, the API will ignore the command after determining that the commanding application is not active (or, the command will only be sent to the device when the application becomes active).

In an embodiment, if the active application program becomes inactive (e.g., loses foreground or is removed from the host's memory) and a different application becomes active, then the API indicates this to the context driver 210 which then deactivates the context associated with that application program and loads the effects from the new active context to the force feedback device 11. Likewise, when the original application program again becomes active, the API instructs the context driver 210 to activate the associated context and load the appropriate effects to the force feedback device.

Device manipulation data 223 is also received by the context driver 210. Data 223 received from the user device is used to set a global device state on the force feedback user device, as described below. This information is passed unmodified to the translation layer 218. The translation layer 218 manages the sending of force feedback effects to the user device, receives information sent from the user device to the host computer, and maintains a virtual representation of the memory of user device. The translation layer 218, in an embodiment, receives an individual effect 219 for the active (or background) application program and device manipulation data 223 sent by the context driver 210. The translation layer 218 receives the effect from a context list 220 of individual effects 222 (list 220 represents a context 214). A different context list 220 is provided in each context 214 of list 212. Each effect 222 in list 220 is a force that is to be output on the mouse 12 by the force feedback device 11. Then the effects are to be sent to the device 11 when commanded by the application, they are selected and copies are output to the device. In an embodiment, each effect is substantially simultaneously output by the translation layer in the order of receiving the effects. Each effect stored in list 220, as examined by the translation layer is available on force feedback device 11, such that the local microprocessor should recognize the effect and be able to output the effect either immediately or when conditions dictate. The size of the list 220 should be the same or smaller than the available memory for such a list in the force feedback device so that the translation layer 218 knows when the memory of the force feedback device is full. If the memory full, the translation layer 218 can delay the output of additional effects until enough memory space is available.

When an active application becomes inactive, the translation layer 218 is instructed by the context driver 210 to "unload" the effects of the context of the previous active application from the force feedback user device. The context driver 210 receives the effects from the active application and loads those effects to the force feedback user device (the effects for the background (primary) application are preferably never unloaded).

The translation layer 218 also handles events, in an embodiment. For example, when a screen position is received from the user device, the translation layer 218 can check whether any of the conditions/triggers of the active events are met. If so, a message is sent which reaches the associated active or background application program, as described in greater detail below. In an embodiment, the microprocessor 130 on device 11 can check for events and send event notifications through the translation layer 218 up to the application program. However, this can be undesirable in some embodiments since the event notification is provided at a much slower rate than the force control loop of the microprocessor 130.

In an embodiment, the translation layer also can store a device state 224 in memory. Device manipulation data 223 from the active application determines the device state, which is the state that the active application program wishes to impose on the device, if any. For example, an overall condition can be stored, such as an enable or disable for all forces, so that if all forces are disabled, no forces will be output by the device. An overall gain can also be set to limit all output force magnitudes to a desired level or percentage of maximum output.

In an embodiment, the translation layer outputs device messages 225 to the device 11 by way of the next layer. Messages may include force effects to be output and/or any other information such as device identification numbers or instructions from the context driver for an effect (start, stop, pause, reset, etc.) The translation layer outputs messages 225 in a form the user device is able to interpret.

In an embodiment, the device communication driver 226 communicates directly with the force feedback user device. Driver 226 receives the device messages 225 from translation layer 218 and directly transmits the messages to the force feedback device over bus 120, e.g., a USB, in an embodiment. The driver is implemented, in an embodiment, as a standard driver to communicate over such a serial port of host computer 18. Other types of drivers and communication interfaces are contemplated and are not limited to the types of drivers described above.

Host Command Structures

The host computer 18 and API 208 handle a variety of processes controlling force feedback user device. Different effects and events are described below.

Effects

Effects are standardized forces that are determined according to a predefined characterization, which may include force algorithms, stored force magnitudes, functions of space and/or time, a history of stored motion values of the mouse, or other steps or parameters. An effect may be based on time and be independent of the manipulation input by the user, or may be spatially determined based on position, velocity, acceleration, or any combination of these. In an embodiment, the user device incorporates a number of effects standardized in its memory which it can implement if the effects are within the active or background context. When the device is determining output forces based on effects, the microprocessor 130 checks if the effect is active, calculates the raw contribution to the output force from the effect, applies an envelope scaling, and sums the scaled contribution to the total sum of forces contributed to by all effects currently being output. In determining the total sum, the user device, in an embodiment, combines all constant forces (e.g., conditions and time-based forces) and limits the constant force sum to a predetermined magnitude. The user device then combines all dynamic forces and limits the dynamic force sum to a predetermined magnitude, in an embodiment. The two sums are then added together and the total force sum is output by the actuators of the user device. Alternatively, all forces can be treated the same and summed together.

Figure 6A:
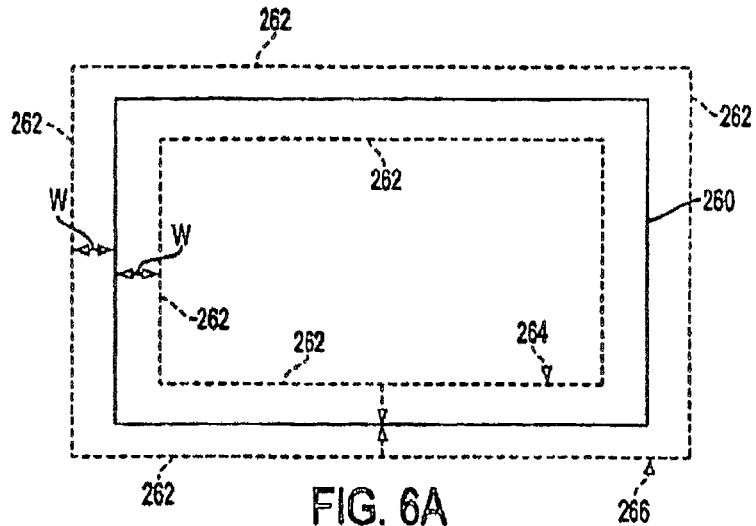
FIGS. 6a, 6b, and 6c are diagrammatic illustrations of embodiments of an enclosure force effect.
Figure 6B:
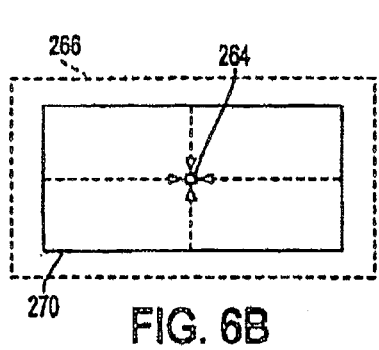

FIGS. 6a and 6b illustrate one type of force effect provided by the host computer in a graphical environment known as an "enclosure." In an embodiment, an enclosure is a rectangular object provided in a GUI which may be assigned with different forces to be output by the user device for each of its portions or sides. The enclosure is a type of force feedback object that can be used for a variety of different graphical objects, including buttons, windows, sliders, scrollbars, menus, links on a web page, or grid points in a drawing program.

FIG. 6a illustrates the use of an enclosure for a window in a GUI. The window 260 is displayed on the computer screen of the host computer, in an embodiment. In an embodiment of the window is displayed on the user device itself (e.g., touch screen, touch panel). The enclosure has eight walls 262 associated with it invisible to the visual perception of the user, where four walls are provided as an inner rectangle 264 and four walls are provided as an outer rectangle 266. Each wall 262 can be separately defined as either providing a force pulling the user controlled graphical object toward the border of window 260 (attractive force), or pushing the user controlled graphical object away from the border of window 260 (resistive force). The outer rectangle 266 walls affect the user controlled graphical object when the user object is outside the window 260 between the rectangle 266 and the window 260 border. In addition, the inner rectangle 264 walls affect the user controlled graphical object when it is inside the window 260 between the rectangle 264 and the window border. In an embodiment, a window 260 is associated with a force enclosure by defining both outer rectangle 266 and inner rectangle 264 to have an attractive force, so that the user object and cursor tend to be attracted to the window border when within the appropriate range of the window. This, for example, allows the user to acquire the border and adjust the size of the window easily. In an embodiment, the outer rectangle 266 can be defined as a resistive force (such as a spring) that requires the user to overcome the resistance to allow the user object entry into the window (and the rectangle 266 can also be defined as a click surface to cause a function to be applied when gaining entry). When the user controlled graphical object gains entry to an enclosure, an "event" occurs and is indicated to the application program, as explained above. In an embodiment, enclosures can be similarly defined for circles, ellipses, triangles, or other shapes, both regular and irregular.

In an embodiment, the enclosure object has a number of other parameters that further define the enclosure. For example, parameters may be specified separately for each wall to define such characteristics as the magnitude of the resistive or attractive forces, which of the eight walls are assigned forces, which walls provide clipping, the saturation level of the force applied in association with a wall, and the interior force, which can be specified as any force effect such as a damping, texture, or vibration force, that is applied while the graphical object is inside the enclosure.

FIG. 6b illustrates another embodiment of an enclosure. A button 270 is shown in FIG. 6b which can be a graphical button, a menu item, or an icon in a GUI. The outer rectangle 266 shown in dashed lines in FIG. 6b has been "turned off" so that no forces are associated with it. The inner rectangle 264 has been defined as a very small rectangle at the center of the button 270. Resistive forces are associated with the inner rectangular walls such that, once the user object has entered the enclosure, a force is applied and biases the user device toward the center of the button 270. This allows the user to target or "acquire" the button more easily with the cursor and reduces overshooting the button by accident by moving the cursor too far past the button.

Enclosures are quite useful for adding forces to web links on a web page viewed in a web browser, such as Netscape Communicator by Netscape Communications, Firefox, or Internet Explorer by Microsoft. The inner wall forces of FIG. 6b can be used on a web link displayed on a web page to draw the graphical object onto a desired link, thus allowing a user to more easily determine which images are links on the page. Other types of forces can also serve this function. Also, an "inside condition" such as a texture can be provided for the web link to cause some links to feel rough, some smooth, some bumpy, etc.

An example of an enclosure effect structure is provided below:

```
ENCLOSURE
typedef struct {
    DWORD dwSize;
```

```
        RECT rectOutside;
        DWORD dwXWidth;
        DWORD dwYWidth;
        DWORD dwXStiffness;
        DWORD dwYStiffness;
        DWORD dwStiffnessMask;
        DWORD dwClippingMask;
        DWORD dwXSaturation;
        DWORD dwYSaturation;
        LP_CONDITION pInsideCondition
} ENCLOSURE;
``` dwSize: Size of the structure in bytes.
rectOutside: Outside borders of the enclosure, in screen coordinates. When the mouse position is outside of rectangle defined by rectOutside, there are no forces exerted on the device from this enclosure.
dwXWidth, dwYWidth: Width W of the region between a wall and the object border. In one implementation, the width of the inner wall and the outer wall regions is the same. Alternatively, they can be defined separately. This parameter can alternatively be specified as a deadband.
dwXStiffness: Stiffness of the left and right walls. Defines the amount of horizontal resistance (force) felt by the user when attempting to break through a vertical wall. This value amounts to the negative and positive coefficient of horizontal spring conditions that are applied when the mouse is in the left and right walls, respectively.
dwYStiffness: Stiffness of the top and bottom walls. Defines the amount of vertical resistance (force) felt by the user when attempting to break through a horizontal wall.
dwStiffnessMask: Mask specifying when resistance should be applied. Can be one or more of the following values:
NONE: No resistance is felt on any wall.
INBOUNDTOPWALL, INBOUNDLEFTWALL, etc.: Resistance is felt when entering the enclosure through the top, bottom, left, or right wall, as specified.
OUTBOUNDTOPWALL, OUTBOUNDLEFTWALL, etc.: Resistance is felt when exiting the enclosure through the top, bottom, left, or right wall, as specified.
INBOUNDANYWALL, OUTBOUNDANYWALL: Resistance is felt when entering or exiting, respectively, the enclosure through any wall.
ANYWALL: Resistance is felt when entering or exiting the enclosure through any wall.
dwClippingMask: Mask specifying when mouse cursor clipping should be applied. Can be one or more of the following values:
NONE: Clipping is not applied to any wall
INBOUNDTOPWALL, INBOUNDLEFTWALL, etc.: Clipping is applied when entering the enclosure through the top, bottom, left, or right wall, respectively.
OUTBOUNDTOPWALL, OUTBOUNDLEFTWALL, etc.: Clipping is applied when exiting the enclosure through the top, bottom, left, or right wall, respectively.
INBOUNDANYWALL, OUTBOUNDANYWALL: Clipping is applied when entering or exiting, respectively, the enclosure through any wall
ANYWALL: Clipping is applied when entering or exiting the enclosure through any wall.
dwXSaturation, dwYSaturation: Saturation level of spring effect felt by the user when attempting to break through a vertical or horizontal wall, respectively.
pInsideCondition: Points to a condition that is to be in effect when the user mouse is in the deadband area. For example, can specify a spring condition, damper condition, and/or texture condition inside the enclosure. This is useful in graphical environments such as GUIs and web pages/web browsers.

In another example of an enclosure, a circular or elliptical shape is defined. For example, an elliptical enclosure can include only one wall that is curved all the way around the ellipse. The inner and outer walls can still be provided, as well as the rest of the other parameters. The dimensions of the ellipse/circle can be provided as X and Y widths. Alternatively, an eccentricity parameter can define the eccentricity of the ellipse.

With enclosures, an issue often arises whereby the forces of the enclosure are desirable at one point in time but not at a different point in time. For example, a button having an enclosure has an attractive force associated with the enclosure to assist the user in acquiring the button with the cursor. However, once the cursor is positioned inside the enclosure, the user may want to be able to freely move the cursor again without experiencing the enclosure wall forces since the target button has already been acquired. Thus, in an embodiment, the forces associated with the enclosure are turned off once the cursor is moved inside the enclosure. In an embodiment, the force magnitudes can be weakened or adjusted to a lower level, e.g., ⅓ the normal magnitude, to allow the cursor to easily exit the enclosure. Once the cursor has exited the enclosure, the forces are then turned back on.

In an embodiment, the forces associated with the enclosure can be turned off or weakened for a predetermined period of time to allow the user to move the cursor out of the enclosure without hindrance, and then the forces can be automatically turned back on once the time has expired. In an embodiment, the forces are turned off only when the cursor has not moved for a predetermined period of time. This indicates that the user has acquired the desired target. In an embodiment, the forces may be turned off when a command gesture, such as a button 15 activation, is detected. These various embodiments can also be combined in other embodiments as desired. The host or microprocessor can determine when the enclosure has been entered and exited by the graphical object through the use of events, explained below.

Enclosures can also be defined to compensate for particularities of user control of the user device. For example, up and down movement of a mouse for most users is much easier that left-to-right movement. An enclosure having equal strength forces on all walls will feel as if the left and right walls have stronger forces. Thus, the upper and lower walls can be defined with stronger forces, e.g., two times the magnitude of the left and right wall forces, to compensate for this effect. Such an enclosure typically feels as if forces of all the walls are of equal strength.

Figure 6C:
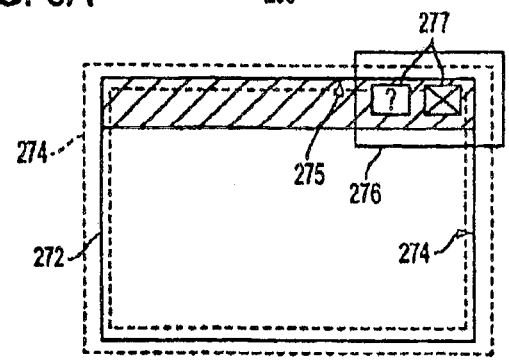

FIG. 6c illustrates another use of enclosures in accordance with an embodiment. Enclosures can be used with events to provide some enclosures with priority over other enclosures. The enclosure with priority can change the characteristics of another enclosure, such as the strength of forces of the walls of the other enclosure. For example, window 272 is associated with a force enclosure 274. The walls of enclosure 274 surround the borders 275 of the window and have an associated force to attract the graphical object to the border. Buttons 277 are also included in window 272 which are near the border 275 and which may be selected by the user. Buttons 277 have their own enclosures defined in the interior of the buttons. The problem is that the forces from the enclosure 274 and the forces from the button enclosures conflict. A user may not be able to select the button easily due to the graphical object being stuck between competing enclosure forces.

In an embodiment, an enclosure 276 can be defined to control the effects of other enclosures. For example, the enclosure 276 occupies a region around buttons 277 and is not visible to the user. Enclosure 276 turns off the forces of enclosure 274 inside its borders and leaves the snap forces of the buttons 277 on. This allows the user to feel the snap forces of the buttons 277 without conflict from the forces of the window enclosure 274. Alternatively, the forces of enclosure 274 can be reduced inside enclosure 276 to an extent so that the user is not encumbered by competing forces. A similar type of enclosure can be used on sliders, where the moveable "thumb" of the slider can be provided with an enclosure similar to enclosure 276 surrounding it. The enclosure surrounding the slider turns off or reduces forces from other enclosures and allows the snap attractive force of the thumb to attract the user object to the "thumb." In addition, events may be used to determine when the graphical object enters the enclosure 276.

Figure 7:
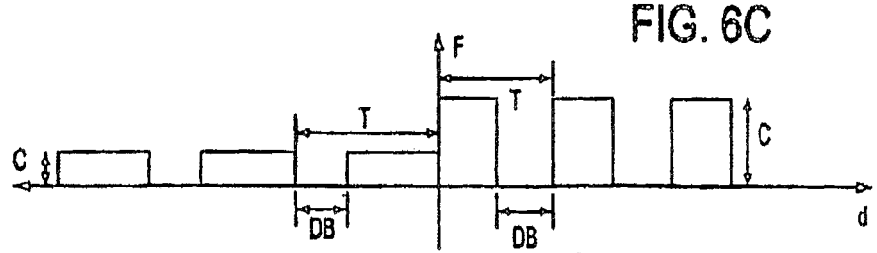
FIG. 7 is a diagrammatic illustration of a texture force effect.

FIG. 7 illustrates a different effect useful in force feedback applications known as a texture in accordance with an embodiment. A texture is a condition, similar to friction, which causes the user device or user's digit to feel as if it were traveling over a series of bumps. FIG. 7 illustrates a distance vs. force graph in which a number of bumps are defined with a coefficient C, a period T, and a deadband DB. Bumps in the positive distance region are felt when the user device or digit is moved in a positive direction, and bumps in the negative distance region are felt when the user device or digit is moved in the negative direction. There is a separate height (coefficient) and period of the bumps for the positive and negative directions along a particular axis of the mouse 12 so that different textures can be felt depending on the direction of the user device or digit. Directional textures can be used, for example, to achieve a velvet-like effect. The deadband value can apply for both directions. Textures are defined as a condition and can include parameters such as:

Positive Coefficient, Negative Coefficient: Height (magnitude) of bumps when travelling along the axis in the positive or negative direction, respectively.

Positive Saturation, Negative Saturation: Period, in pixels, of bumps (bump width plus deadband width) when travelling along the axis in the positive or negative direction, respectively.

DeadBand: Percentage of period which is not occupied by a bump.

Figure 8:
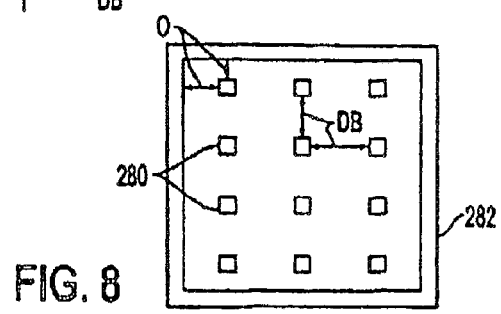
FIG. 8 is a diagrammatic illustration of a grid force effect.

FIG. 8 illustrates a different force feedback effect useful in force feedback applications known as a "grid." A grid is a condition that creates a 2-dimensional array of snap points 280, which are forces attracting the user device to the point when the user device moves over the point. Grids can be stand-alone conditions, but they can also be useful when associated with enclosures. The geometrical attributes of a grid inside of an enclosure 282 are depicted in FIG. 8. Grids are defined as a condition and can include parameters such as those below, also illustrated in FIG. 8.

Offset (O): If the grid is inside an enclosure, the Offset defines the horizontal and vertical distance, in pixels, from the upper left corner of the enclosure's deadband to the first snap point. If the grid is stand-alone, it defines the horizontal and vertical distance, in pixels, from the upper left corner of screen to the first snap point.

Positive Coefficient (C): Strength of snap points (jolts).
PositiveSaturation (S): Saturation of snap points.
DeadBand (DB): Vertical and horizontal spacing, in pixels, between snap points.

Grids can also be implemented as one-dimensional forces, e.g., as tick marks on a slider or any other graphical object when moved. The tick marks would only be felt when the user device or user digit was moving in the defined dimension. For example, a slider can be defined with a one-dimensional grid so that, as the knob of the slider is moved, a snap point is applied as the knob moves over each tick of the grid. The ticks thus have a spatial correlation with the distance that the knob has moved and inform the user of such.

Events

One structure used by the host computer in force feedback implementation is called an "event." Events are notifications from the force feedback device to application programs 202, 204, and 206 of one or more actions or interactions that have occurred in the graphical environment which has been sensed by the force feedback user device. For example, an event can be any interaction of the graphical object in the graphical environment with another graphical object. Thus, an event can be defined when the graphical object enters into an enclosure object (described below) through a particular border. In an embodiment, an event can be triggered when the graphical object moves over a close box of a window, or the graphical object moves over a file icon and a button is pressed. In an embodiment, an event can also be defined when the graphical object moves within a specified range of a particular graphical object or region. In an embodiment, an event may be defined with a temporal component, e.g., an event is triggered when the graphical object remains in a particular region for a specified period of time. Events are similar to button press triggers in that a condition is detected on the force feedback device, independently of the host computer. However, the trigger for the event is a graphical interaction rather than a physical button press. In an embodiment, the trigger for the event may be a graphical interaction in addition to any user input into the user device.

An application program initially defines what the event is by creating an event definition with the API 208 (FIG. 4). In an embodiment, the event definition includes an event identifier, an application program (or window) identifier, information specifying actions that trigger an event notification, and force effects, if any, that the event is associated with. The application program, in an embodiment, assigns a separate identification value to each event at the time of creating the event, and keeps track of the created identification values in its own list. The API can enable, disable, or delete an event at the request of an application program.

The translation layer receives and stores events when the application that created the event is the active or background application program. Thus, events are included in the active context. The translation layer 218 checks for events based on the position of the graphical object (or user device) received from the force feedback device when the associated application program is (or becomes) active. The translation layer 218 then sends the event notification up to the context driver (or API), which sends an event notification to the application program, e.g., sends a message to a window handler which the application program checks. The event notification includes the event identifier so that the application program can check its own list and identify the event. Once identified, the application program initiates the appropriate response as defined by the developer, e.g., running another application program, outputting a sound, displaying a new image, etc. Alternatively, the force feedback device is loaded with the defined event similar to being loaded with effects. The local microprocessor 130 can check for events (for active application programs) and send information back through the translation layer to the context driver to notify the application program.

For an application program to receive an event notification, the application's context must be active, i.e., the application must be active or background. Thus, inactive applications will not receive event notifications. Some events can be defined to have priority over other events. For example, if a trigger is associated with an event in a foreground context as well as an event in a background context, the foreground context can be defined to have priority so that only the application program in the foreground receives an event notification. In an embodiment, only the background application, or both the foreground and background applications, can receive the event notification.

In an embodiment, both one-time event triggers and periodic event triggers are available. One time event triggers are triggers associated with discrete actions that have no significant duration, such as breaking through an enclosure. Periodic event triggers are associated with conditions that have a finite duration, such as being inside the wall of an enclosure, or holding down a scroll button. During the duration of the condition which triggers the event (e.g., while the cursor is inside the enclosure), the API repeatedly sends event notifications to the application program according to a predetermined periodicity that can be set by the user or application program.

In an example embodiment, the application program creates an event definition for an enclosure event. This is an event that occurs when a user moves the cursor into an enclosure. The event definition includes a unique event identifier, an identifier for the application program that created it, actions that trigger the event notification (entering the enclosure), and any effects (such as the particular enclosure) which the event is associated with.

An example of an event structure is provided below:

```
EVENT
typedef struct {
    DWORD dwSize;
    HWND hWndEventHandler;
    WORD wRef;
    DWORD dwfTrigger;
    LPI_EFFECT pEffect;
} EVENT;
``` dwSize: Size of the structure in bytes. This member must be initialized before the structure is used.
hWndEventHandler: Handle of window to which event notifications are sent.
wRef: 16-bit application-defined value to identify the event. This value is defined by the application to identify events that it has created. The application assigns a separate wRef value to each event at the time of creation. Each subsequent event notification that the application receives will be tagged with its associated wRef value. When the application processes the window message that receives event notifications, it will compare the wRef value to its own internal list and take action accordingly.
dwfTrigger: Flags specifying actions that trigger the event notification.
pEffect: Particular effect (e.g., enclosure), if any, in the GUI that this event is associated with.

The following are examples of flags that can be included as triggers for an event.
ONENTERTOP, ONENTERLEFT, etc.: The mouse broke into the associated enclosure by breaking through the top, bottom, left, or right wall, as specified.
ONEXITTOP, ONEXITLEFT, etc.: The mouse broke out of the associated enclosure by breaking through the top, bottom, left, or right wall, as specified.
ONENTERANY, ONEXITANY: The mouse broke into or out of the associated enclosure.
INBOUNDTOPWALL, INBOUNDLEFTWALL, etc.: The mouse is in the top, bottom, left, or right wall, as specified, and attempting to break into the associated enclosure.
OUTBOUNDTOPWALL, OUTBOUNDLEFTWALL, etc.: The mouse is in the top, bottom, left, or right wall, as specified, and attempting to break out of the associated enclosure.
INBOUNDANYWALL, OUTBOUNDANYWALL: The mouse is in a wall and attempting to break into or out of the associated enclosure.
ANYWALL: The mouse is in a wall of the associated enclosure.
ONSCROLL: The user is holding down the scroll button of the mouse.
ONEFFECTCOMPLETION: The associated effect has completed.

The host computer or force feedback user device may also command the user device to act as a different type of control device for some embodiments. For example, the force feedback user device may also be used in conjunction with game application programs, simulations, or the like, in which a joystick or other type of controller is typically used. User device can be configured to work with such game applications in a "joystick mode" as if it were a standard force feedback joystick, or as if it were a non-force-feedback joystick. The user device may include a physical switch or software switch provided in master application 206 or other program on the host computer to allow switching between the joystick mode and any other mode capability of the user device.

The mouse user device 12 as shown in FIG. 1b is not easily applicable to many applications intended for use with a joystick, since the mouse is a planar device having a free workspace while a joystick typically has rotary degrees of freedom and springs to bias the joystick to a center position. In an embodiment, when the mouse device 11 is used in the joystick mode, spring forces are applied to bias the mouse 12 toward the center of its workspace. These forces are applied by actuators 64 and controlled by the local microprocessor 130 as background forces that are always in effect, unless the device is switched out of joystick mode.

Force Feedback Device Implementations

In an embodiment, the force feedback user device includes a local microprocessor 130 that implements various processes to provide the functionality and features of the force feedback implementation described herein. Various aspects of the force feedback device implementation are described below.

Reference Frames

The force feedback user device as described herein needs the ability to know the location of the graphical object on the display device. This is because the device must monitor the interaction of the graphical object with other objects in the graphical environment to determine when associated forces should be output by the user device. The force feedback device uses different reference frames, in an embodiment, to determine where the graphical object is positioned on the display. There are three primary reference frames that are described herein: the device (or local) frame 30, the ballistic frame, and the screen (or host) frame 28.

The device frame 30 is the frame of the physical workspace of the force feedback device. In an embodiment, the device frame 30 is defined with the origin at the top left, the positive x direction to the right and the positive y direction down. This frame 30 is used to describe the absolute position of the end point of the mechanism in its workspace. The scale of "movement units" for the device frame 30 is arbitrary and fixed, although it should be a higher resolution than the resolution of sensors 62 to guarantee no loss of sensor data. Furthermore, in an embodiment, the device position is scaled to reflect a 4:3 aspect ratio, which matches the typical computer monitor size, although other aspect ratios are contemplated for different applications and display sizes.

In an embodiment, rate-control indexing is provided by the system. This allows the user to utilize the user device in reaching the limits of its workspace and still control the graphical object in the same direction. In brief, the central portion of the device workspace is designated as the position control region, where a change in position of the user device in its workspace directly correlates to a change in position of the graphical object on the screen. The change in device position is translated to a change in ballistic position based on the velocity of the device, according to a ballistics algorithm (described below).

An edge region of the device frame 30 is designated as the rate-control region, in which the mode of moving the graphical object changes from position control to rate control, where the graphical object continues to move on the screen in the same direction while the user device is in the rate control region. The rate control region boundary is accompanied by a repelling force that pushes the user object towards the center of the device workspace. As the user pushes against this force, the graphical object is moved in a speed proportional to the distance the device is displaced into the rate control region. Therefore, the graphical object moves relative to device position in the rate control region, not relative to device motion. This mode may be thought of as moving the position control central area of the device frame around the screen using rate control. The size of the rate control region is specified by a percentage. For example, a 400×300 device workspace has a rate-control region of 10%. The graphical object position would be determined according to a position control paradigm when the user object position is read between the values of (x, y)=(20,15) and (380, 285) of the device frame, and according to a rate control paradigm if the user object position is outside of that range.

The screen frame 28 is used to describe the position of the cursor (or other user-controlled graphical object) on the screen. It is defined with the origin at the top left, the positive x direction to the right and the positive y direction down. This frame is scaled corresponding to the resolution of the display device 20 (or devices 20). For example, if a display screen resolution is set to 1024×768 pixels, the x screen position ranges from 0 to 1023 as the cursor moves to the right and from 0 to 767 as the graphical object moves down. All coordinate communication between the force feedback device and the host computer are in terms of screen coordinates (normalized for device standards).

The ballistic frame (or "scaled frame") is a frame created by the force feedback user device to determine the position of the graphical object. By applying a ballistics algorithm to the change in position of the user object, the position of the graphical object is determined. The ballistic frame is defined as a multiple of the screen frame, i.e., the ballistic frame has a higher resolution than the screen frame, but has the same aspect ratio as the screen frame. The ballistic frame is created by the force feedback device so that pixel changes smaller than one screen pixel can be made to the graphical object position, which is crucial when implementing the fast control loop rates demanded by force-feedback. For example, if the control frequency is 1 kHz, and a monitor provides 1000 pixels across, a change of 1 pixel per control cycle would cause the cursor to travel the entire screen width in one second. In rate control mode, such adjustments in the graphical object position may have to be made every control cycle, which is far too fast to allow control of the graphical object.

Thus, a frame with higher resolution, the ballistic frame, needs to be defined to allow the force feedback device to change cursor position at its own control frequency, but which can be divided down to the screen frame size to slow down the graphical object as it is moved across the screen. In addition, the aspect ratio of the ballistic frame is the same as that of the screen frame. This allows force effects on the device to spatially correlate with graphical objects displayed on the display device. This is described in greater detail below.

In an embodiment, the microprocessor makes transformations between frames to convert a device position to an eventual screen coordinate. When transforming from the device frame to the ballistic frame, the microprocessor may use sensitivity. Sensitivity is the ratio of the size of the device frame to the size of the ballistic frame. A higher value of sensitivity allows the cursor to traverse the screen with less physical motion of the user device, thus making it more difficult to control the graphical object. A lower value of sensitivity allows more motion on the device to cause less motion of the graphical object on the screen, and is suitable for finer control. At low sensitivity values, the graphical object may only be able to reach the entire screen area by using rate control mode.

In an embodiment, the graphical object can exactly move across the entire width of the screen as the user device or user's digit is manipulated across the extent of the position control region of the device workspace, as long as the velocity remains in a middle range to provide a one-to-two ballistic mapping (a one-to-one ballistic mapping is provided with velocities in the lower range, causing less movement; and a one-to-four ballistic mapping is provided with velocities in the high range, causing more cursor movement). As sensitivity is increased, the screen can be traversed in less than the entire position control region of the device workspace (assuming a middle range velocity). At lower sensitivities, the entire screen cannot be traversed (assuming a middle range velocity) without using the rate control mode.

Since the aspect ratios of the device frame and the ballistic frame may not match, updating position changes in the ballistic frame may require that a change in device position (or a simulated change, when in rate control mode) be added to the ballistic frame. If changes in mouse position are always used, problems with different aspect ratios are eliminated. This is described in greater detail below.

Transforming from the ballistic frame to the screen frame is simpler. Once the ballistic position is known, the position of the graphical object in the screen frame can be found by dividing the ballistic position by the known multiple. Thus, if the ballistic frame is defined to be 10 times the resolution of the screen frame, the ballistic position is divided by 10 to obtain the screen position.

Position Reporting

Standard user device controllers, such as a computer mouse, are open-loop devices which report position changes in its workspace to the host computer and have no ability to know the current cursor position. The force feedback user device, in contrast, needs to know the location of the graphical object on the display device of the host computer, since the user device must monitor the interaction of the graphical object with other objects in the graphical environment to determine when associated forces should be output.

There are two primary means for a force feedback user device to report its position to the host and to know the screen position of the graphical object. In an embodiment, the user device knows the location of the graphical object by reporting (normalized) absolute coordinates to the host computer to dictate the position of the graphical object. For example, the actual screen coordinates of the graphical object can be determined by the user device and reported to the host, whereby the host displays the graphical object at the reported coordinates. This allows the user device to know exactly where the graphical object is at all times, and to therefore have an accurate model of the screen for use with outputting forces. However, any ballistic behavior of the graphical object must be calculated on the user device itself, creating more calculation overhead for the local microprocessor 130. In addition, an absolute reporting scheme is not compatible with traditional, non-force-feedback user devices, thus excluding a default mode in case the force feedback functionality is not operational.

A second method provides a force feedback user device that reports position changes in its workspace and relies on the host computer to send back the position information. This approach allows the host software to maintain the job of doing ballistics, but requires twice the communication as well as a need for the mouse to predict intermediate values of position while waiting for the next host position update, since the reporting occurs at a slower rate (e.g., about 50-60 Hz) than the haptic control rate (e.g., about 1000 Hz). This embodiment is described in greater detail with respect to FIG. 13.

In an embodiment, the processes are implemented as firmware in integrated circuits and memory provided on the force feedback device. Alternatively, the processes can be implemented as hardware or software, or a mixture of these. The processes themselves can be implemented using program instructions or code stored on or transferred through a computer readable medium, such as a memory chip, circuit or other device; magnetic media such as hard disk, floppy disk, or tape; or other media such as CD-ROM, DVD, PCMCIA cards, etc. The program instructions may also be transmitted through a channel to device 11 from a different source.

Figure 9:
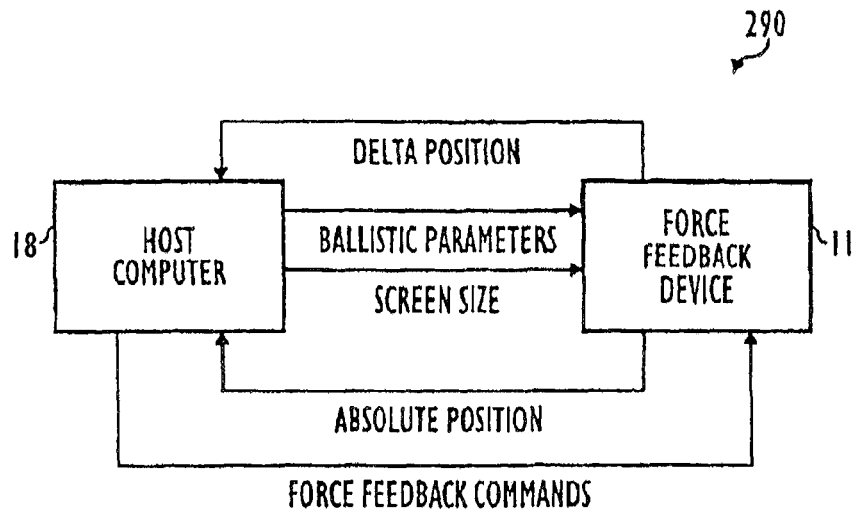
FIG. 9 is a block diagram illustrating implementing the force feedback device and system in accordance with an embodiment.

FIG. 9 is a block diagram illustrating an embodiment 290. In this embodiment, both relative and absolute position reporting modes are used. As referred to herein, relative position reporting means that the force feedback device reports only changes in position of the user object 12 to the host computer, i.e., a difference between a new position and the last reported position, while absolute position reporting means that absolute coordinates are reported to the host from which the host can directly display the graphical object. Most force feedback controllers use absolute position reporting since the position of the graphical object on the screen must be known to implement forces.

With absolute position reporting, the host computer cannot detect the force feedback device as a standard input controller, such as a mouse, touch screen, or other user device. If relative position reporting were provided, the host computer can detect the force feedback user device as a traditional non-force-feedback user device. This is desirable when force feedback functionality is not active to allow the user to select options within the operating system, such as during startup of the device before force feedback drivers have been loaded or during emergencies when force feedback is not enabled.

In an embodiment, the system includes a relative positioning mode when the force feedback user device is powered up and/or when the host computer 18 first detects the force feedback device. In this mode, the user device provides a device delta position to the host as shown in FIG. 9. The host expects to receive a delta value upon startup, and thus simply processes the delta position normally. This allows the user to use the device for normal positioning of the graphical object in a graphical environment before force functionality has been initialized. The microprocessor does not need to model the graphical object position in this stage of the process because no force feedback functionality has yet been enabled on the user device. However, once the force feedback functionality is enabled, e.g., the force feedback driver software has been enabled on the host computer, then an absolute position is reported to the host in place of the delta position relative position reporting. In addition, ballistic parameters and the host screen size are sent to the user device to allow the user device to determine the absolute position of the graphical object. Force feedback commands are also sent to the device in this stage when appropriate.

Figure 10:
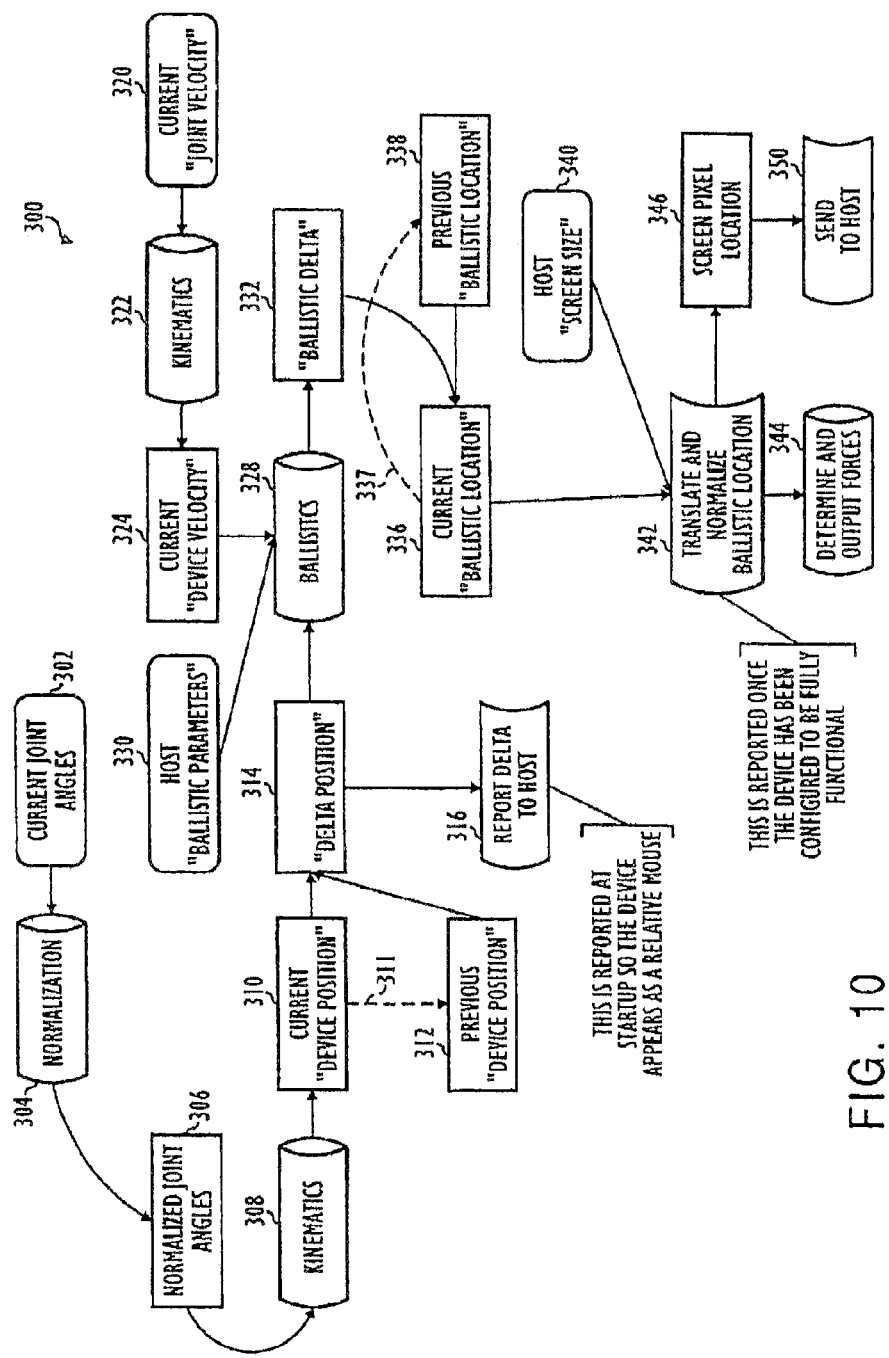
FIG. 10 is a flow diagram illustrating a method of implementing position reporting in accordance with an embodiment.

FIG. 10 illustrates a process 300 for providing force feedback in accordance with an embodiment. In an embodiment in which the user device includes a mechanical portion as described above, current joint angles 302 are measured by sensors of the force feedback device. For example, in the embodiment of FIGS. 1 and 2, the joint angles between members 44, 46, 48, and 50 are determined based on the current position of the encoder arc as sensed by the emitter and detector of sensor 62. The joint angles can be determined since the precise measurements of the members of linkage 40 are known and are in a known position relative to each other based on the sensor 62 reading. In a process box 304, the current joint angles are normalized based on the sensed range of the mouse 12 in its degrees of freedom. Since the exact range of the mouse 12 (or other user object) may not be precisely known due to variations in the device or other irregularities, the normalization process uses a sensed range of motion to determine and assign physical angles between the members of the linkage 40.

For example, the minimum sensor value that has been detected so far is considered to be one limit of the motion of the mouse, and the maximum sensor value detected so far is considered to be the other limit to the mouse range. In successive iterations of the process 300, the mouse eventually will be moved to the physical limits of the device and the angle values will be updated accordingly. This tends to produce more accurate results than an assumed range of motion, since manufacturing tolerances of the components of device 11 provide slightly varying dimensions, link lengths, and angle ranges that cause discrepancies from device to device. In an embodiment, the force feedback device (microprocessor 130) can control the actuators of the device to move the mouse 12 to all the limits of the mouse 12 in a short startup procedure to determine the actual angle ranges. It should be noted that although a mouse is referred to in relation to the above description, any other device can be utilized instead of computer mouse without departing from the inventive embodiments discussed herein.

In the embodiment described in FIGS. 1 and 2, the normalized joint angles 306 resulting from box 304 are then processed by applying kinematics in box 308. Kinematic equations, as is well-known to those skilled in the art, are used to derive a position of a desired point on a mechanical linkage or other apparatus from known lengths of links in the linkage and the current angles between those links. For example, a Cartesian position of a point on the linkage in a Cartesian (or other type) coordinate system can be determined using geometrical equations. A current device position 310 is determined from the kinematics of box 308, which is the position of the mouse 12 in its workspace.

The current device position 310 is used, with a previous device position 312, to determine a device delta position 314. The previous device position 312 was the current device position 310 in a previous iteration of process 300; this is indicated by the dashed line 311 between current and previous device positions. The device delta position 314 is simply the difference between the current device position 310 and the previous device position 312. In box 316, the microprocessor 130 sends the determined delta position 314 to the host computer 18 over bus 120. This is a relative position reporting step and is only performed if the system 10 does not yet have force feedback functionality, e.g., at startup when the force feedback drivers are being loaded. The host computer uses the delta position to position the graphical object on the screen of display device 20. For example, the host computer adjusts the position of a graphical object by the delta amount to achieve a new position of the graphical object in the screen frame 28. During relative position reporting mode, the delta position 314 is sent to the host at a slower rate than the rate of process 300; therefore, in some iterations of process 300, the delta need not be reported to the host. This is because the host only needs to receive a cursor delta position at the rate of displaying the cursor on the screen, which typically is on the order of 60 Hz or every 20 ms. The microprocessor 130, on the other hand, must control forces at a much higher rate (1000 Hz or above) and thus needs to execute process 300 much faster.

In the embodiment in which the device is in relative position reporting mode, the process iteration is complete after the delta position 314 is reported to the host. The process then returns to measure joint angles 302 and start the next iteration when triggered to do so. The microprocessor does not need to model the cursor position in this mode because no force feedback functionality has yet been enabled on the device 11.

Relative position reporting mode is then exited and absolute position reporting mode is entered when the appropriate software drivers or other programs are loaded into the memory of host computer 18 to allow the host to recognize, interface with, and command the force feedback information to the user device 11. In absolute position reporting mode, the delta position 314 continues to be determined as described above. However, the delta position is no longer reported directly to the host computer, but is instead used in a ballistics process to determine a ballistic delta, described below.

In absolute position reporting mode, the force feedback device 11 also determines a velocity of the user object for use in the present process in addition to or alternative to the joint angle processing described above. A current joint velocity 320 is first measured. In the preferred embodiment, this is accomplished by a dedicated circuit or device that determines a velocity from the sensed positions reported by sensors 62, e.g., the sensed positions of members 44 and 48. For example, a "haptic accelerator" device can include a circuit dedicated to calculating velocity from multiple sensed positions and time periods between the sensed positions. Alternatively, velocity sensors can be used to directly measure velocity of joints or members of the device.

The current joint velocity 320 is used in a process box 322 which uses kinematics in determining device velocity. As described above, kinematics are well-known equations for determining position, and also are used to determine a velocity of a desired point of a linkage. Thus, the kinematics can be used to determine the velocity of the mouse 12, which is referred to as the "device velocity" herein. The current device velocity 324 resulting from box 322 indicates the current velocity of mouse 12.

In an embodiment, the ballistics box 328 uses a ballistic algorithm or similar method to model or predict a position of the graphical object in the screen frame 28 based on the position and velocity of the user device. This modeling is accomplished to allow the local microprocessor 130 to determine where the graphical object is positioned in the ballistic frame. Using the spatial layout of graphical objects that is stored locally in memory 134 and which is continually updated by the host, the local microprocessor determines when the graphical object is interacting with a graphical object and when to output forces associated with the interaction. The local determination of the graphical object position allows the microprocessor to know the position of the graphical object for the determination of forces.

In the ballistics box 328, the local microprocessor uses a ballistics algorithm to determine a "ballistic delta" for the graphical object, (i.e., a change in position of the graphical object measured in the ballistic frame), and an embodiment. A ballistics algorithm is a method of changing the position of the graphical object so as to break the direct mapping between the user device's position and the graphical object position to allow the user greater control over the position of the graphical object. For example, most ballistics algorithms vary the position of the graphical object based on the velocity of the user device in its workspace. The faster the velocity of the user device, the greater the distance that the graphical object is moved on the screen for a given distance the user device is moved. This allows slow motions of the user device to finely control the graphical object, while fast motions coarsely control the graphical object and allow the graphical object to be moved quickly across the screen. Other algorithms can also be used which are similar to ballistics in that graphical object position is altered to allow fine graphical object control in situations when needed and to allow coarse graphical object control when needed.

In an embodiment, the microprocessor 130 uses a ballistic algorithm that provides two velocity thresholds to determine how far the graphical object is to be moved or manipulated. This is described in greater detail below in the method of FIG. 11. Other ballistics algorithms may be used in other embodiments; e.g., a continuous algorithm that adjusts graphical object position continuously along a range of mouse velocity.

In an embodiment, the microprocessor uses several types of data to determine the ballistic delta of the graphical object, including the device delta position 314, current device velocity 324, and host ballistic parameters 330. The host ballistic parameters 330 are received by the microprocessor 130 from the host at some point before the process 300 starts, or when the ballistic model changes, and are stored in local memory 134 to be accessed when required. Such parameters can include the distance to move the graphical object for each threshold range of device velocity, the velocity values of the two thresholds, and any conditions concerning when to apply the ballistics algorithm. If the host changes ballistics algorithms, notification can be sent to the microprocessor 130 and new parameters stored in local memory 134. The microprocessor 130 examines the current device velocity 324 and the parameters 330 to determine in which threshold range the mouse velocity currently is placed, and then multiplies the device delta position by the appropriate amount (e.g., 1, 2, or 4, depending on the velocity). This results in the ballistic delta 332, which is provided in terms of the ballistic frame.

Changes in position of the user device (i.e., delta positions 314) are used in the absolute position reporting mode, because this allows problems with changes to screen aspect ratios and resolutions to be alleviated. In an embodiment, an indexing function of the device is implemented which may cause the ballistic delta 332 to be calculated differently in a rate control mode.

The microprocessor then proceeds to a process box 334, in which a current ballistic location (or "scaled position") 336 of the graphical object is determined in the ballistic frame. To accomplish this, the microprocessor uses the ballistic delta 332, and the previous ballistic location 338. The previous ballistic location 338 was the current ballistic location 336 in an earlier iteration of process 300, as indicated by dashed line 337. Previous location 338 can be stored in local memory 134 and then discarded after being used to determine the current ballistic location. At its simplest level, the current ballistic location 336 is determined in box 334 by taking the previous ballistic location 338 and adjusting that location by the ballistic delta 332.

The current ballistic location 336, however, cannot be directly transformed to a screen pixel position in the screen frame. Box 342 uses the current ballistic location 336 and the host screen size 340 to determine the screen pixel location. In an embodiment, the host screen size 340 is the current pixel resolution and/or aspect ratio being displayed on the display device 20 of the host computer 18. For example, the host may be displaying a screen resolution of 800×600 pixels, 1024× 768 pixels, or 1280×960 pixels. Also, in some embodiments, the host may be displaying a different aspect ratio. For example, a typical computer monitor aspect ratio is 4:3; however, if two monitors are connected to provide a continuous screen space, the aspect ratio becomes 8:3, i.e., double the size of a single screen in one dimension. The host screen size 340 can be received by the device 11 when the ballistic parameters 330 are received, or at any other time (and/or when sensitivity information is received, if applicable). Different resolutions or aspect ratios have different numbers of pixels in respective dimensions of the screen and thus cause displayed objects to appear in different areas of the screen. For example, if a graphical object is centered in the screen at 640×480 resolution, the object will appear in the upper left quadrant of the screen when the resolution changes to 1280×960.

The change in resolution or aspect ratio can create a problem with force sensations created by the force feedback device. The device has been sent a spatial layout of objects from the host that indicates the coordinates of an object on the screen. When the screen size is changed, and the device is not informed, the device will output forces corresponding to the object as it appeared in the old screen size. This can cause large discrepancies between where an object is displayed and where the forces of an object are encountered in the device workspace. For example, if an icon is at coordinates (64,48) on a 640×480 resolution screen, the device knows that the icon is positioned 10% of the entire screen dimension away from the top and left borders of the screen workspace. The device accordingly outputs associated forces when the user device is moved into the region of the device workspace corresponding to the icon, i.e., 10% of the workspace distance from the top and left borders of the workspace. However, after a resolution change to 1280×960, the icon is displayed 5% of the screen dimension away from the top and left borders. The device, however, would output forces based on the old position of the icon, which no longer corresponds with the position of the icon. Thus, the device needs to be told the new screen resolution so it may provide forces at the appropriate region of the device workspace.

Similarly, a change in aspect ratio can cause distortion in the force feedback sensations output by the user device. For example, a circle object is displayed on a 4:3 aspect ratio screen and has a force wall surrounding its shape. The circle will feel like a circle on the device if the ballistic frame also has an aspect ratio of 4:3. However, if another monitor is activated so that the screen has an 8:3 aspect ratio, the circle object will feel like an oval if the screen is directly mapped to the device frame, i.e., if the device frame is "stretched" to fit the screen frame. The use of delta positions 314 prevents this distortion. Since only changes in the mouse position are used to determine graphical object position, and not an absolute mouse position in the device workspace, the graphical object is positioned without distortion. However, the new aspect ratio still needs to be communicated to the force feedback device since there is a larger area in which the graphical object may be positioned. For example, in a 4:3 aspect ratio, the microprocessor might clip a pixel location to the edge of the screen if that location were beyond the edge of the displayed range. However, on an 8:3 aspect ratio, the location should not be clipped since the displayed range is larger.

To prevent distortion caused by a change in screen size, the ballistic location 336 of the graphical object is divided by a divisor that takes the host screen size into account, in an embodiment. For example, if the ballistic frame is 10 times the resolution of the screen frame, then the divisor is 10. Therefore, the ballistic location 336 would be divided by 10 to achieve a screen pixel position of the graphical object if the host screen size had not changed. If the host screen size did change, then the ballistic frame is resized to take the new screen size into account. In an embodiment, the screen pixel position is equal to the screen size times the ballistic location divided by the ballistic frame size (i.e., the divisor). Thus, if screen resolution on the host has doubled, the divisor would halve, and the screen pixel location would double. The host can also send sensitivity information to the device. If a new sensitivity value is received, the ballistic frame is resized accordingly; as sensitivity is increased, the ballistic frame size is decreased.

Once the screen pixel location is translated from the ballistic position 336, the screen pixel location is then typically normalized to a standardized range of numbers since communication software and devices have standard values to receive. The normalized screen pixel position 346 is then sent to the host computer as an absolute position in box 350, e.g., as coordinates for display on the screen. The host receives the screen pixel location 346 and displays the graphical object appropriately.

In box 344, the local processor 130 uses the (preferably non-normalized) screen pixel location (and other data) to determine whether any forces should be output, and outputs those forces. For example, the local microprocessor checks the spatial layout of graphical objects which is stored in local memory 134 and determines whether the screen pixel location intersects or contacts any of those objects. If so, there may be a force associated with the interaction, depending on the graphical object intersected. Such a force would be calculated based on a variety of data. Such data may include the device velocity 324, the device position 310, the elapsed time from an event, the distance from a different graphical object in the graphical environment, a history of past mouse motion, etc. Once box 346 is complete (and any other desired boxes in the provision of forces, which is not detailed herein), the process when needed returns to the measuring of joint angles 302 and joint velocity 320 to begin another iteration of the absolute position reporting process.

In an embodiment, no error correction is required, because the force feedback device 11 is operating in absolute mode when the pixel position is determined. The host thus no longer receives a change in position (delta) of the user object, but receives an absolute coordinate in a coordinate system. The host thus does not need to perform any other significant processing (such as ballistics) to display the graphical object, i.e., the local microprocessor solely performs the necessary adjustments, such as ballistics, and reports the adjusted position to the host computer. Thus, the host and local microprocessor have the same position value for the graphical object, and no opportunity exists for the two positions to diverge.

Figure 11:
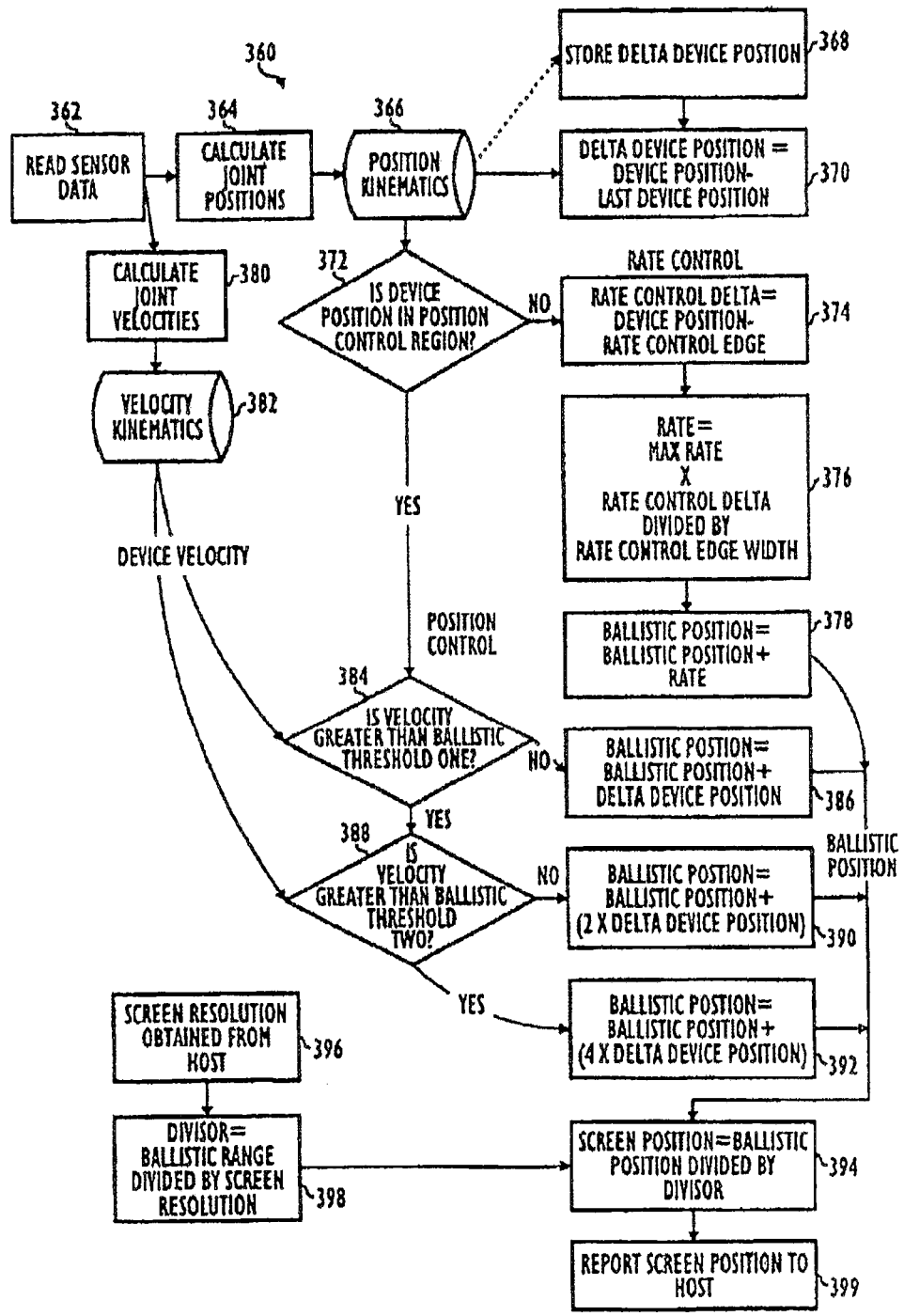
FIG. 11 is a flow diagram illustrating a method of determining graphical object position and indexing in accordance with an embodiment.

FIG. 11 illustrates a flow diagram of a method in accordance with an embodiment. In particular, the method is for implementing enhanced graphical object control and indexing in the absolute position reporting mode. This method provides ballistics for graphical object positioning as well as indexing functionality. In an embodiment, the user device workspace includes a central position control region in which the user device controls the graphical object according to a position control scheme. An isometric edge region is provided around the position control region of the user device workspace. When the user device is moved into the isometric region, a resistive force is applied to the user device and the graphical object is moved according to a rate control method, where the speed of the graphical object is proportional to the amount of penetration into the isometric region. This allows a user to move the graphical object throughout the screen frame without causing the user to experience disconcerting interruptions due to the mouse colliding with physical limits to the mouse workspace.

The method 360 is similar to the indexing methods described above in that a position control region and isometric edge region are provided in the user device workspace. Method 360 begins at 362, in which raw sensor data is read using the sensors 62. In box 364, the joint positions of linkage 40 are calculated from the raw sensor data in an embodiment which utilizes a mechanical portion as shown in FIGS. 1 and 2. In box 366, position kinematics are used to determine the device position (position of the user object) in the device frame, as explained above with reference to FIG. 10. The last device position is stored in local memory 134 in box 368, and a delta device position is determined in box 370 using the current device position resulting from box 366 and the last device position stored in box 368. Thereafter, the system and method checks whether the device position is in the position control region of the device frame (372). If not, the user device is in the isometric region and is in rate control mode, where a resistive force is preferably output on the user device opposing movement into the region. In box 374, the rate control delta is calculated to be the difference between the device position and the rate control edge; this provides the distance of penetration into the isometric region. In box 376, the rate of graphical object movement is equal to the maximum rate times the rate control delta divided by the rate control edge width (i.e., the width of the isometric region). The rate control delta divided by the rate control edge width provides the percentage of penetration of the user device into the isometric region, which is designated to be the same percentage of the maximum rate of the user device. The maximum rate can be set by the developer in an embodiment, such as 1000 ballistic pixels per second or 8000 ballistic pixels per second. In box 378, the ballistic position (i.e., the position of the graphical object in the ballistic frame) is set equal to the old ballistic position plus the rate determined in box 376. The process then continues to box 394, detailed below.

If the device position is in the position control region in box 372, then a position control method is followed. Boxes 384-392 implement a ballistics algorithm to provide enhanced graphical object control to the user of device 11, in an embodiment. This algorithm is generally as follows. If the current device velocity is below the first threshold, the graphical object is moved by the smallest amount, e.g., a one-to-one mapping between device movement units and ballistic pixels. If the current device velocity is between the first and second thresholds, the graphical object is moved double the amount of pixels as it is moved when user device velocity is under the first threshold, e.g., a one-to-two mapping between device and ballistic frames. If the user object velocity is above the second threshold, the graphical object is moved double the amount of pixels as between the first and second thresholds (a one-to-four mapping between device and ballistic frames). In other embodiments, more or less thresholds, or a continuous function, can be used. Also, the host may change the ballistics algorithm in a variety of ways and indicate the changes to the device 11 using ballistic parameters 330 as described for FIG. 10.

Thus, in an embodiment, box 384 checks the device velocity so that a ballistic position may be determined. The device velocity is determined in boxes 380 and 382, where box 380 determines joint velocities from the sensor data read in box 362 and device velocity is determined from the joint velocities and velocity kinematics in box 382, as described above in FIG. 10. In box 384, this device velocity is compared to the ballistic thresholds used in the ballistics algorithm. If the device velocity is within the first ballistic threshold in box 384, then box 386 determines the new ballistic position to be the old ballistic position plus the delta device position (from box 370). The process then continues to box 394, detailed below. If the device velocity is greater than the first ballistic threshold, then in box 388 the device velocity is compared to the second ballistic threshold. If the device velocity is between the first and second thresholds, then in box 390 the new ballistic position is set equal to the old ballistic position plus twice the delta device position. This causes the graphical object to move at a faster rate, based on the velocity of the user device. The process then continues to box 394, detailed below. If the device velocity is greater than the second ballistic threshold in box 388, then in box 392 the new ballistic position is set equal to the old ballistic position plus 4 times the delta device position. The process then continues to box 394.

In box 394, the screen position of the graphical object is set equal to the ballistic position as determined in one of boxes 378, 386, 390, and 392 divided by a divisor. The divisor is known from the resolution of the ballistic frame and the resolution of the screen frame, as follows. In box 396, the screen resolution (or size) is obtained from the host. In box 398, the divisor is set equal to the ballistic range (or resolution) divided by the screen resolution as detailed above.

After the screen position is determined in box 394, it is sent to the host computer as shown in box 399 and used in the display of the graphical object in the screen frame. The device 11 also determines and outputs forces, as detailed in FIG. 10. It should be noted that the forces on user device may be determined or calculated differently in rate control (isometric) mode than in position control mode.

Figure 12:
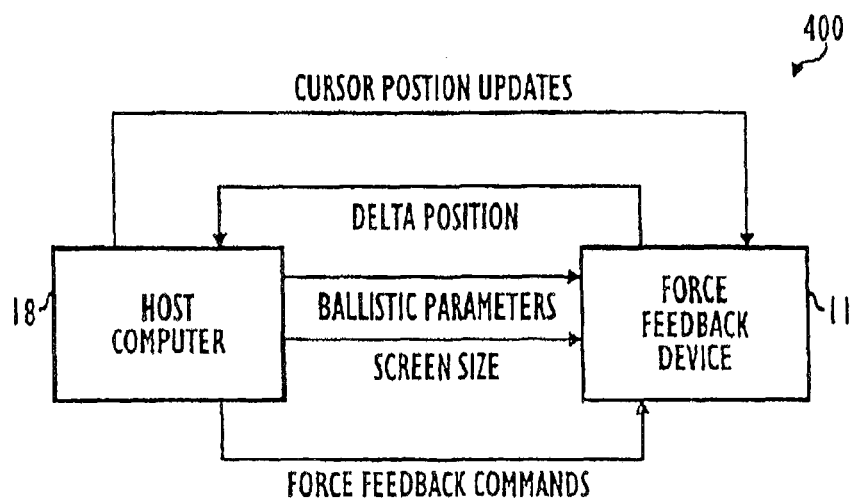
FIG. 12 is a block diagram illustrating implementing the force feedback device and system in accordance with an embodiment.

FIG. 12 is a block diagram of a method for reporting positions to a host computer from a force feedback device in accordance with an embodiment. Embodiment 400 provides relative position reporting from the force feedback device 11 to the host computer 18. This is advantageous in that the force feedback device is detected by the host as a standard non-force-feedback, where the host computer can use standard drivers and other software. This allows the user to control GUI functions even when force feedback is not currently active, such as during startup of the device or during failures of the force feedback functionality. In addition, a relative position reporting process is more appropriate than an absolute position reporting process for such interface devices as trackballs, in which an unrestricted workspace and range of motion is provided for the user object 12. For example, the spherical ball in a trackball controller, dexterous glove, or wireless game controller can be moved in any direction for any number of revolutions and is not as suitable for use with an absolute coordinate system as a device having a workspace with known limits.

Embodiment 400 provides a device delta position to the host computer from which the host computer determines a graphical object screen pixel position. The host computer sends graphical object position updates to the force feedback device to provide the graphical object position which the device needs to determine when forces are output and to determine the force characteristics. However, since the host graphical object position updates occur at a much slower rate, the device must model the graphical object position on its own to be able to output forces between host graphical object updates. Thus, the host sends ballistic parameters and screen size information so the device can model the graphical object position. When the device receives an update, it corrects for any error between its modeled position and the actual graphical object position, as detailed below. The host also sends force feedback commands to the device to indicate which forces are to be output.

Figure 13:
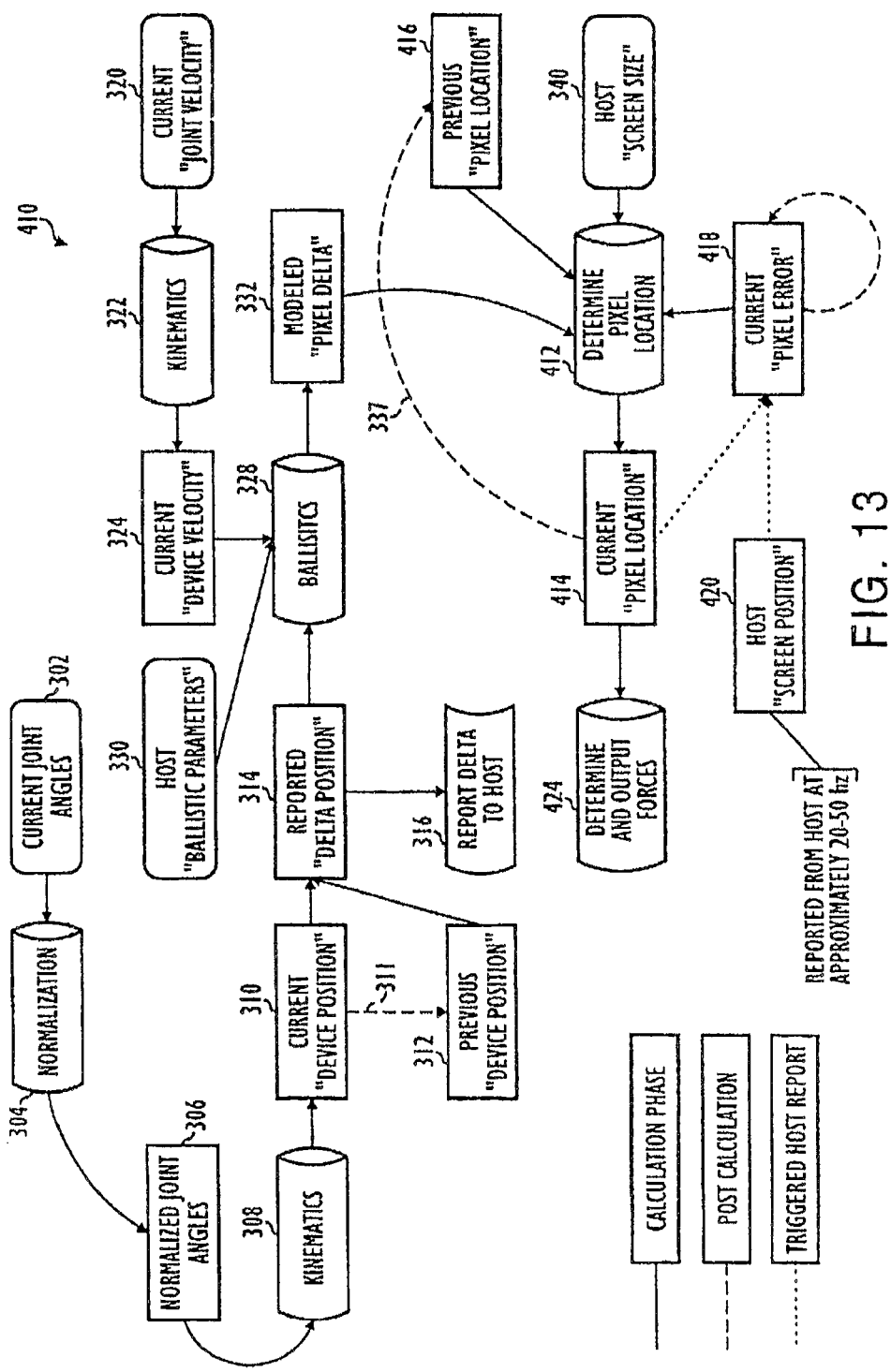
FIG. 13 is a flow diagram illustrating a method of implementing position reporting in accordance with an embodiment.

FIG. 13 illustrates a process 410 for implementing the embodiment 400 shown in FIG. 12. A difference between method 300 and method 410 of the first embodiment is that the host independently determines a screen graphical object position in parallel with the microprocessor modeling the graphical object screen position. Since the host controls the actual position of the graphical object, its screen position is considered the "correct" or actual graphical object position, while the device modeled value is only approximate. In an embodiment, the host continually sends the actual screen position to the device so that errors in the modeled screen position can be corrected and so the forces can be correctly correlated with the actual graphical object position.

In an embodiment in which the user device utilizes a mechanical portion, the current joint angles 302 are measured and normalized in box 304, and the normalized joint angles 306 are processed with kinematics in box 308 to provide a current device position 310. The current device position 310 and previous device position 312 are used to determine a delta position 314, which is reported to the host computer 18 in box 316 over bus 120. Unlike the process 300, the delta position 314 is always reported to the host computer, i.e., there is no absolute position to report at any stage of the process. The host computer uses the delta position to position the graphical object on the display device 20. For example, the host computer adjusts the position of the graphical object using the delta amount and its own ballistics algorithm to achieve a new position of the graphical object in the screen frame 28. The delta position 314 is sent to the host at a slower rate than the rate of process 410. Therefore, in some iterations of process 410, the delta need not be reported to the host, because the host only needs to receive a graphical object delta position at the rate of displaying the graphical object on the screen, which typically is on the order of 60 Hz or every 20 ms. The microprocessor 130, on the other hand, computes forces at a much higher rate (1000 Hz or above) and executes process 300 much faster.

The current joint velocity 320 also is read in process 410 (both the joint angles 302 and the joint velocity 320 are always measured in the current process). Kinematics are applied in box 322 to obtain the current device velocity 324, and ballistics are applied in box 328 using the device velocity 324, ballistic parameters 330, and delta position 314 to obtain a "modeled" pixel delta 332. The pixel delta 332 is a modeled or predicted value in this embodiment, because the host has determined the actual screen position using its own ballistics algorithm and using the delta position 314 provided by the device. The microprocessor 130 preferably uses in box 328 the same ballistics algorithm used by the host computer in its determination of graphical object position.

In box 412, a current pixel location is modeled using the modeled pixel delta 332, a previous pixel location 416, and the host screen size 340, resulting in a current pixel location 414. Box 412 is similar to box 334 of process 300 in that pixel delta 332 and the previous pixel location 416 are used substantially similarly. The host screen size information can be used to determine whether the determined pixel location should be clipped or not. For example, if the aspect ratio has changed from 4:3 to 8:3, double the amount of area is provided. If the pixel location is one that would normally extend beyond the edge of a 4:3 screen area, it would be clipped to the border of the 4:3 screen, but may not be clipped if it is still within the 8:3 area. In one embodiment, if the change in screen size is to a different resolution, the current pixel location can also be adjusted depending on the change in resolution. For example, if screen resolution has been adjusted from 640×480 to 1280×960, then the pixel delta can be doubled before it is added to the previous pixel location.

Box 412 is different from box 334 in FIG. 10 in that a current pixel error 418 is included in the determination of the current pixel location 414. The pixel error 414 is the error between the graphical object position modeled by the local microprocessor and the actual graphical object position as determined and displayed by the host computer. Although the microprocessor is typically applying the same ballistics algorithm and screen size adjustments to the graphical object pixel location as the host computer, errors can be introduced to cause the two graphical object location calculations to diverge. For example, in some embodiments, the host computer can "clip" the received delta position 314, i.e., ignore the delta position so that the graphical object stays at a constant position. Such a technique is used, for example, to provide realistic obstruction force sensations when forces are limited in magnitude. Additionally, error can be caused by an application program on the host computer moving the graphical object based on the program's own criteria and completely independently of the force feedback device. Further, error can be caused by the host computer switching to a different ballistics algorithm, where a delay exists between the host using the new ballistic algorithm and the force feedback device receiving the parameters for the new algorithm.

The current pixel error 414 is determined by examining the current pixel location 414 at the time of reporting the delta position 314 and a current screen position of the graphical object that has been received from the host computer. The host computer periodically reports a current screen position 420 of the graphical object to the microprocessor 130, where the screen position is based on the delta position 314 reported to the host in box 316. The reporting of the screen position by the host is triggered by receiving the delta position 314 from the device, and the microprocessor recalculates pixel error when it receives the host screen position 420.

In an embodiment, the microprocessor compares the received screen position 420 with the modeled current pixel location 414 at the time of report 316 (it should be noted that the current pixel location 414 may have a previously-determined error correction value included in its determination, as explained below). If the two locations are the same, no error exists between the two graphical object positions, and the microprocessor uses the current pixel location 414 as the location of the graphical object in its force calculations and force outputs. If the two locations are not the same, error exists between the two graphical object positions and the current pixel location 414 must therefore be corrected. An error correction value is determined as the difference between the current pixel location 414 and the host screen position 420. This value, when added to (or subtracted from) the pixel location 414, will cause the two graphical object locations to be the same. Alternatively, if the microprocessor knows the error, then the current pixel location can be adjusted to provide no error.

In an embodiment, the screen position 414 from the host is reported to the microprocessor 130 at a slower rate than the rate of process 410, since the force feedback process must be much faster than the displaying processes of the host computer. There may therefore be several iterations of process 410 before the screen position 420 is reported by the host to the microprocessor 130. Therefore, once the error correction value is determined after one report of screen position 420, that same value is continually used in iterations providing the determination of current pixel location 414 until the next screen position 420 is received from the host.

In an embodiment, it is desirable to "smooth out" the correction of the error in pixel location 414 by only incrementally changing the pixel location 414 in each iteration of process 410. For example, if the current pixel location 414 were adjusted with the entire error correction value at one time, this might cause a large change in the pixel location 414. If forces output on the user object are based on the current pixel location 414 of the graphical object, then the user may notice the correction of the error by feeling a small jump or discontinuity in the forces applied to mouse 12 after the error is corrected. This is because the forces were determined based on a pixel location having a large error at one point in time, and then the forces are based on the corrected pixel location at the next point in time. Thus, the difference in pixel locations in each iteration is preferably smoothed by only partially correcting the current pixel location 414. With such smoothing, the user does not feel as large a discontinuity in forces when the error in pixel position 414 is corrected. The error correction rate is preferably based on the desired system modeling. The error can be corrected at a rate so that there is no error between the pixel location 414 and the host screen position 420 by the time a new host screen position 420 is received (which may provide a new error, of course). Or, the error can be corrected at a rate that spans multiple received host screen positions 420. Typically, the correction of errors is desired to be as slow as possible to maintain high fidelity of forces to the user, yet the error must be corrected fast enough so as not to create a discontinuity between what the host is displaying on the display device and the forces the user feels on the force feedback device.

Figure 14:
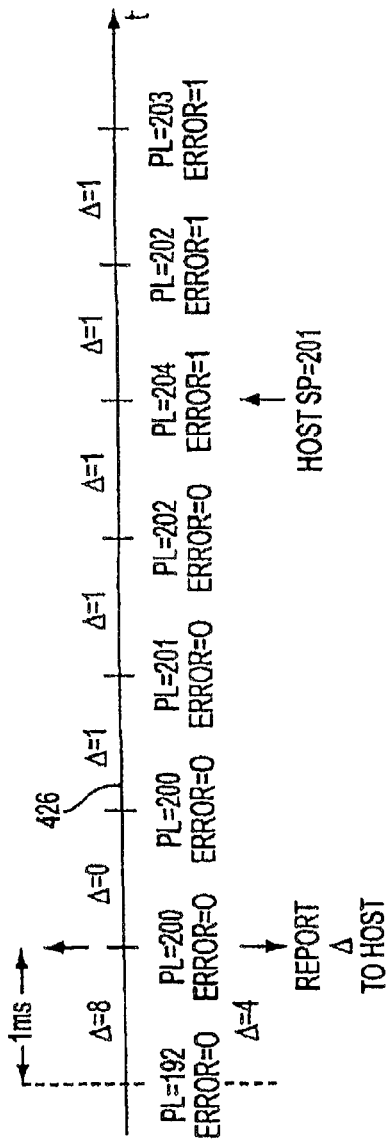
FIGS. 14 and 15 are diagrammatic illustrations showing the error correction between graphical object positions from host computer and force feedback device in accordance with an embodiment.

FIG. 14 is a diagrammatic illustration of an example of the pixel location error correction process explained above. The line 426 represents a time scale, and each vertical mark represents another iteration of process 410. At the first iteration, the pixel location 414 is determined to be 192 (assuming a single dimension of user object motion) and the error 418 between the pixel location and host screen position is 0. At the next iteration, the pixel location is 200, and the delta position of 4 is reported to the host as in box 316. Over the next iterations, the pixel location is determined to be 200, 201, and 202. At the sixth iteration, the pixel location is determined to be 203; in addition, the host reports a host screen position of 201. Since this screen position was determined based on the delta position 314 reported to the host in the second iteration, the error is measured between the pixel location determined at the second iteration (200) and the host screen position received at the sixth iteration (201). The error value of 1 is then included in the current pixel location, so that the pixel location of 203 is corrected to be 204 based on the error value. This example demonstrates that the pixel location 384 determined by the microprocessor 130, when error exists, is corrected a few iterations behind the actual screen position determined by the host. The microprocessor 130 locally stores the pixel location 414 that was determined in the iteration when the delta position 314 was reported to the host so that the error correction value can be accurately determined. It should be noted that, in the example of FIG. 14, the error value determined at the sixth iteration continues to be added indefinitely. Thus, if further errors are indicated at later host reports, the new error value must be added to the old error value.

Figure 15:
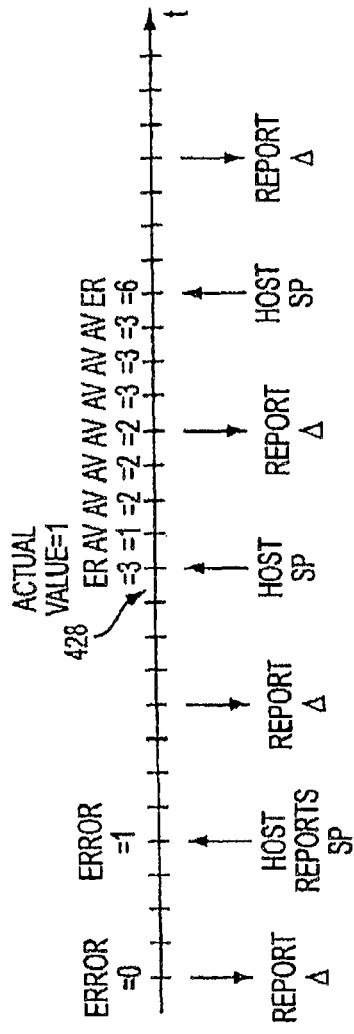

FIG. 15 is a diagrammatic illustration of the error correction value increasing over time. Initially the error correction value is 0 and then 1, as shown in FIG. 15. Over the next host report of the screen position, the current error is 2 pixels, which is added to the previous error correction value of 1 so that the total error correction value is 3. Likewise, in the next host report, the current error is 3 pixels, so that the total error correction value is 6. In one embodiment, if a very large error accumulates, the microprocessor can make the error 0 in one iteration regardless of the effect on the user.

FIG. 15 also demonstrates the smoothing or incremental correction of the modeled pixel location in accordance with an embodiment. In the embodiment shown in FIG. 15, an error of 2 pixels exists at the iteration 428. The value of 2 is not added to the previous error value of 1 immediately, since that may cause a force discontinuity to the user. Instead the 2 pixels are added gradually to the error correction value over the next few iterations. For example, the actual value (AV) added to the pixel location 414 is 0 for the first two iterations after iteration 428, then AV=2 for three more iterations, until the full value of 2 is added in following iterations.

Referring back to the embodiment in FIG. 13, once the current pixel location 414 is determined, the local processor 130 uses that location in box 424 to determine whether any forces should be output and, if so, outputs those forces. It should be noted that most forces are determined preferably based on the velocity of the user object in its workspace, not the velocity of the graphical object in the graphical environment. Thus, these forces will always feel the same to the user, regardless of any error between the modeled pixel location 414 and the host screen position 420, since they are independent of screen velocity. However, some forces are dependent on interactions in the graphical environment, and will be affected by a graphical object position error. Likewise, the ability to initiate or discontinue forces based on interactions in the graphical environment is also affected by graphical object position error. Once box 424 is complete (and any other desired boxes in the provision of forces, which is not detailed herein), the process returns to the measuring of joint angles 302 and joint velocity 320 to begin another iteration of the process, and an embodiment.

Force Feedback Features as Implemented in One or More Embodiments

In the above described embodiments, the host computer performs such tasks as the implementation and display of the graphical environment and graphical object, the implementation of multi-tasking application programs, the sending of high-level force feedback commands to the force feedback device, and the reception of position (or other) data from the force feedback device indicating the user's desired interaction with the computer-implemented environment. The force feedback device, in an embodiment, performs such tasks as reading the position of the user object, receiving high level force feedback commands from the host computer, determining whether a force should be output based on conditions sent from the host computer, and implementing and outputting the required forces when necessary. However, it should be noted that some tasks may be implemented in either or both of the host computer and the force feedback user device.

A force feedback feature that can be implemented in either or both of the host and the force feedback device is "clipping." Clipping is the selective omission of reported position data when displaying the graphical object or other user-controlled graphical object to cause a sensory effect on the user in certain circumstances. Such circumstances include those where displaying the graphical object in correlation with the precise user object position would not provide a desired effect. The most common case for clipping is when the graphical object encounters a surface or object in the graphical environment which is desired for the user to experience as a hard obstruction or wall. The wall is desired to prohibit further movement into the surface or object; however, due to limitations in hardware, a strong enough force cannot be output on the user object to actually prevent motion into the wall.

Clipping can be easily performed by the force feedback device to ease computational burden on the host. For example, the local microprocessor 130 can check whether the user object is being moved into a wall in the graphical environment; if so, the microprocessor can simply discard the position data and report a constant position (or delta) to the host computer that would cause the host to display the graphical object against the wall surface. This allows the host computer to not be involved with the clipping process and simply display the graphical object at the reported position, thus freeing the host to perform other tasks.

The host computer 18 can also perform clipping in an embodiment. Since it is desirable to keep the application programs 202 and 204, the operating system, and other high level programs ignorant of the clipping process, a lower level program preferably handles the clipping. For example, the translation layer 218 as shown in FIG. 4 (or alternatively the context driver or API) can check for the conditions that cause clipping to be applied. If clipping is to be performed, the translation layer alters the input position data appropriately before it is sent on to the context driver, API, operating system and any application programs. Problems with this implementation include increased load on the host with the overhead of intercepting and translating incoming messages.

A different force feedback feature that can be implemented either by the force feedback device or the host computer is "pressure clicks" or "click surfaces." As described above, these are surfaces, objects or regions in a graphical environment which have additional functionality based on the position of the graphical object in relation to the object. Thus, a border of a window can be designated a click surface such that if the user overcomes a resistive force and moves the graphical object (or user object) over a threshold distance into the border, a function is activated. The function can be scrolling a document in the window, closing the window, expanding the window size, etc. A similar click surface can be used on an icon or button to select or activate the icon or button.

The force feedback device can implement click surfaces to ease computational burden on the host computer. The local microprocessor can check whether the graphical object has moved into a click surface or region and output the resistive force as appropriate. When the graphical object is moved past the threshold distance, the microprocessor reports to the host computer that the action associated with the click surface has been made; for example, the microprocessor reports that a button press or double click has been performed by the user. The host receives a signal that a button has been pressed and acts accordingly. Or, the microprocessor reports that a particular click surface has been specifically selected, where the host can interpret the selection and implement an associated function.

The host may also implement at least a portion of the functionality of click surfaces. The microprocessor can output the resistive (or other type) force associated with the click surface, but only reports the user object position to the host. When the host determines that the graphical object (or user object) has moved beyond the threshold distance, the host implements the function associated with the click surface (scrolling text, closing a window, etc.) As with clipping, it is preferred that the translation layer handle this functionality by modifying data accordingly before passing it to the context driver and API.

While the subject has been described in terms of embodiments, it is contemplated that alterations, permutations and equivalents thereof will become apparent to those skilled in the art upon a reading of the specification and study of the drawings. For example, although examples in a GUI are described, the embodiments herein are also very well suited for other two-dimensional graphical environments and especially three-dimensional graphical environments, where a user would like fine positioning in manipulating 3-D objects and moving in a 3-D space. For example, the isometric limits are quite helpful to move a graphical object or controlled object in a 3-D environment further than physical limits of the interface device allow. In addition, many different types of forces can be applied to the user object 12 in accordance with different graphical objects or regions appearing on the computer's display screen and which may be mouse-based force sensations or graphical object-based force sensations. As stated above, many types of user objects and mechanisms can be provided to transmit the forces to the user, such as a mouse, touch screen or other touch device, trackball, joystick, stylus, etc. Furthermore, certain terminology has been used for the purposes of descriptive clarity, and are not limiting.

What is claimed is:

1. A software method in a multi-tasking environment comprising:
concurrently running a plurality of application programs, wherein each application program includes one or more data sets, each data set comprising a representation of one or more force effects;
receiving from an active application program a force effect command;
generating a signal representing the force effect command; and
outputting a force effect based on the signal.

2. The software method of claim 1, wherein the multi-tasking environment includes a graphical user interface.

3. The software method of claim 1, wherein the force effect command is an instruction.

4. The software method of claim 1, wherein the force effect command comprises one or more force effect parameters.

5. The software method of claim 1, wherein the force effect is a single force or a series of forces.

6. The software method of claim 1, further comprising storing the plurality of applications programs in memory.

7. The software method of claim 1, further comprising
making one of the plurality of concurrently running application programs the active application program.

8. A software method in a multi-tasking environment comprising:
storing a plurality of representations of force effects in memory, wherein each representation of a force effect is associated with an application program;
running a plurality of application programs in the multi-tasking environment concurrently;
making one of the plurality of concurrently running application programs active;

receiving from the active application program a force effect command; and generating a signal representing the force effect command.

9. The software method of claim 8, further comprising:

receiving from an inactive application program a second force effect command; and generating a signal representing the second force effect command.

10. A haptic computer system comprising:

a computer memory for storing a plurality of application programs;

a means for concurrently running more than one of the a plurality of application programs in a multi-tasking environment;

a means for making one of the plurality of concurrently running application programs the active application program; and a force sensation generator configured to output one or more force sensations associated with the active application program.

11. A haptic computer system comprising:

a computer memory configured to store a plurality of application programs that command force sensations;

a processor configured to run more than one of the plurality of application programs concurrently;

an operating system configured to provide a multi-tasking environment for the plurality of application programs, wherein one of the plurality of concurrently running applications is an active application program; and an actuator configured to output one or more force sensations commanded by the active application program.

\* \* \* \* \*